US012270702B2

(12) United States Patent
Smet et al.

(10) Patent No.: US 12,270,702 B2
(45) Date of Patent: Apr. 8, 2025

(54) WIRELESS LIGHT DOSIMETER

(71) Applicant: UNIVERSITEIT GENT, Ghent (BE)

(72) Inventors: Philippe Smet, Ledeberg (BE); David Van Der Heggen, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 194 days.

(21) Appl. No.: 18/247,675

(22) PCT Filed: Oct. 4, 2021

(86) PCT No.: PCT/EP2021/077304
§ 371 (c)(1),
(2) Date: Apr. 3, 2023

(87) PCT Pub. No.: WO2022/073936
PCT Pub. Date: Apr. 14, 2022

(65) Prior Publication Data
US 2024/0027264 A1 Jan. 25, 2024

(30) Foreign Application Priority Data
Oct. 5, 2020 (EP) .................................. 20200074

(51) Int. Cl.
*G01J 1/58* (2006.01)
(52) U.S. Cl.
CPC ...................... *G01J 1/58* (2013.01)
(58) Field of Classification Search
CPC .............. G01J 1/58; G21K 4/00; C09K 11/06
See application file for complete search history.

(56) References Cited

U.S. PATENT DOCUMENTS

| 4,755,673 A | * | 7/1988 | Pollack ................... F24S 70/10 |
| | | | 431/100 |
| 5,811,822 A | | 9/1998 | Huston et al. |
| 8,853,651 B2 | * | 10/2014 | Doty ........................ G21K 4/00 |
| | | | 250/459.1 |
| 2003/0030067 A1 | * | 2/2003 | Chen ...................... G01K 11/20 |
| | | | 257/E33.002 |

OTHER PUBLICATIONS

L.C. Oliveira et al., "Lanthanide-doped MgO: A case study on how to design new phosphors for dosimetry with tailored uminescent properties", Journal of Luminescence, vol. 209, Jan. 11, 2019, pp. 21-30.
International Search Report from corresponding PCT Application No. PCT/EP2021/077304, Jan. 20, 2022.
Extended European Search Report from corresponding European Application No. 20200074.1, Mar. 31, 2021.

* cited by examiner

*Primary Examiner* — Dani Fox
*Assistant Examiner* — Fani Polyzos Boosalis
(74) *Attorney, Agent, or Firm* — Workman Nydegger

(57) ABSTRACT

A light sensing device includes: a light sensitive layer having a phosphor with two different types of lanthanides dopant ions, switching between a first state and a second state; one or more optical filters on top of the light sensitive layer. When the dopant ions are in the second state after exposure of the light sensitive layer to the second light energy, the light sensitive layer measures a first light intensity of light of the first light energy. When the dopant ions are in the first state after exposure of the light sensitive layer to the first light energy, the light sensitive layer measures a second light intensity of light of the second light energy.

12 Claims, 12 Drawing Sheets

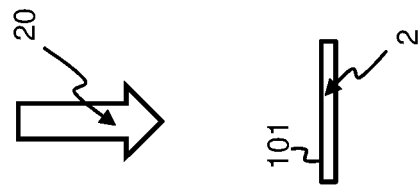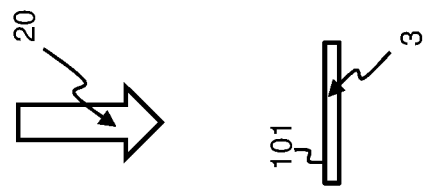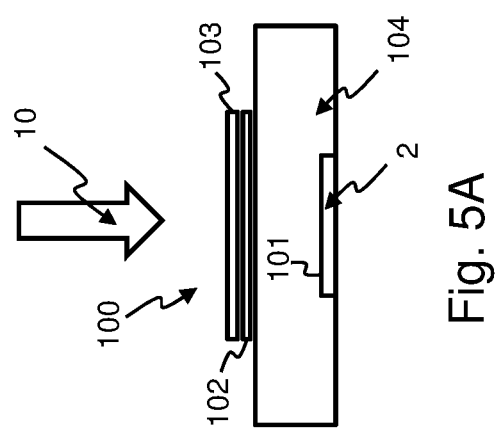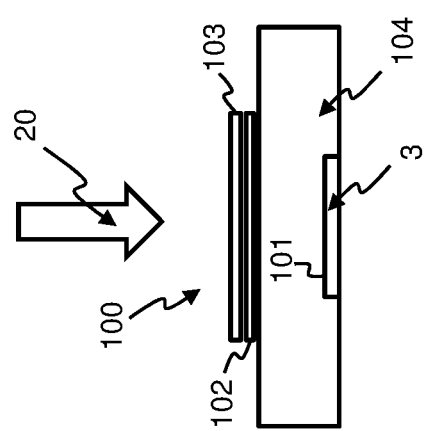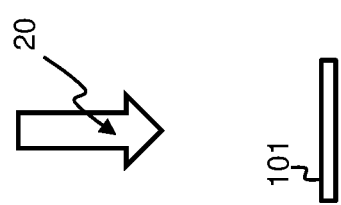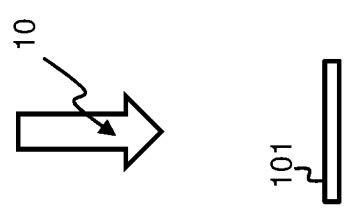
Fig. 5A
Fig. 5B

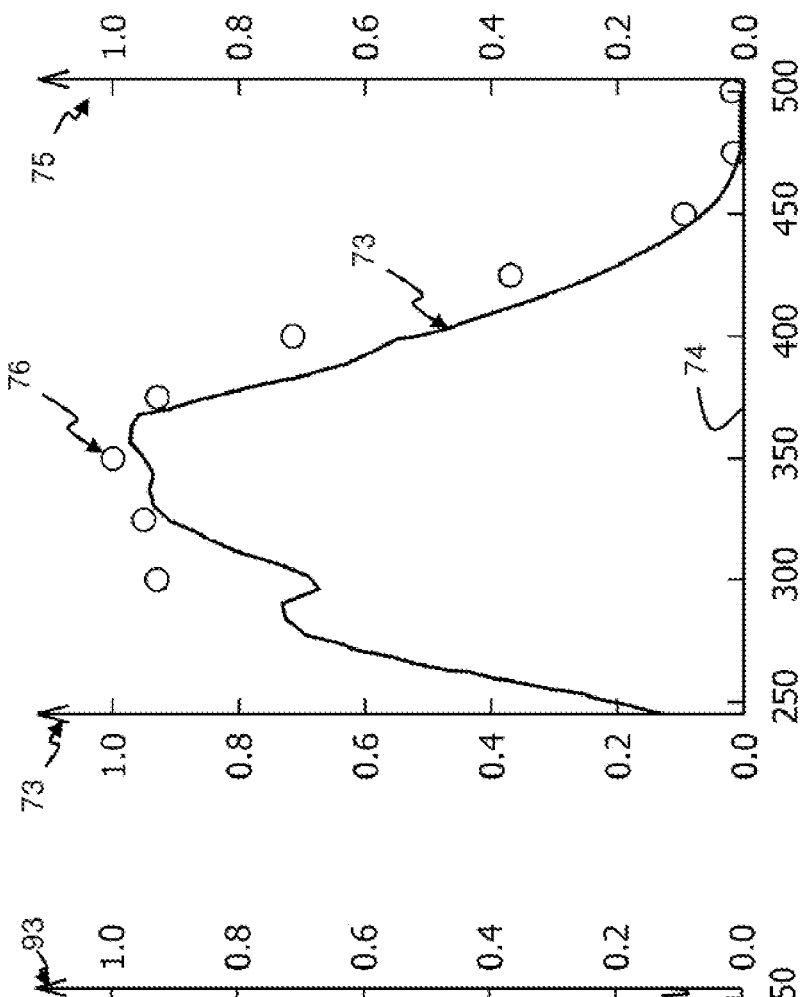
Fig. 9(b)
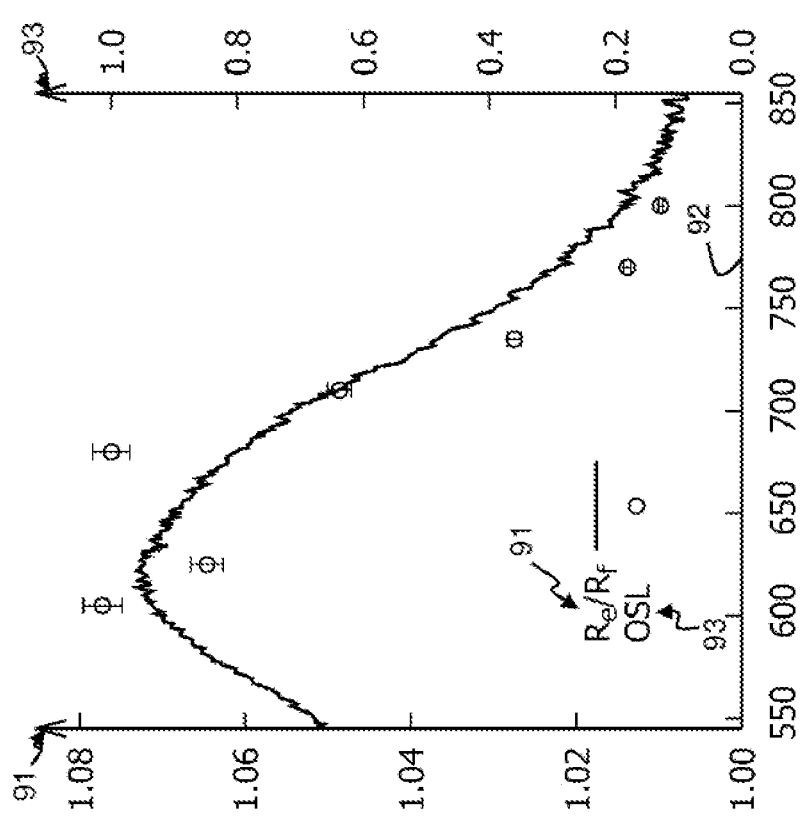
Fig. 9(a)
Fig. 9

WIRELESS LIGHT DOSIMETER

TECHNICAL FIELD

The present invention generally relates, amongst others, to a method and a wireless light dosimeter for measuring a light intensity. More particularly, it relates to a light sensing device and a read-out device to measure light intensities in a wireless and reliable manner and over a large dynamic range and a large spectral range.

BACKGROUND

The use of ultraviolet, visible or infrared light is relevant in several technical fields, such as for example in medicine, in the food industry, in agriculture, in the transportation industry, in biotechnology, etc. For example, proper illumination in food preparation and production areas is absolutely critical to food protection, sanitation and employee safety. The use of ultraviolet, visible or infrared light has also been increasing in the health sector wherein light and ionizing radiations are used both in medical diagnosis and medical treatments. For example, blue light therapy is commonly used to prevent or treat sun damage and premalignant or malignant skin cancer growths. Blue light can actually be used to prevent skin cancer and remove both cancerous skin lesions or treat any type of skin disorders such as acne or help treat depression. As a further example in the health sector, light can be used to illuminate pharmaceuticals, sterilize syringes, serum bags, surgical material, among others. Further examples of the use of ultraviolet, visible or infrared light include the production processes of for example tires and rubber products, and in the electronics industry, the production of semiconductors or co-polymerization processes. Lighting is also commonly applied in for example plant production, mushroom production, microalgae cultivation, and aquaculture among other forms of agricultural production. In livestock production, lighting has been widely used in for example illuminating livestock fields, fishing light, poultry light and in selective insect trapping lamps.

This broad range of applications of ultraviolet, visible or infrared light requires accurate and reliable monitoring of the intensity of the illuminating light. Indeed, for most applications, monitoring light intensities allows making sure the production process is not jeopardized and/or that employees or consumers are not put at risk by over illuminating or respectively under illuminating. Monitoring light intensities can also be particularly relevant in passive applications, such as for example the management of the environment in museums and galleries. Light can indeed be damaging for collections, and the monitoring of light radiation is part of the fundamental environmental management museums and galleries cannot ignore. The effects of light are cumulative, as a result, an object's total light exposure is important data to collect in order to preserve it, such as for example for higher risk objects like textiles, watercolors, prints, food, etc.

A radiation dosimeter is a device that measures dose uptake of for example external ionizing radiation. The ionizing radiation can for example be X-rays, alpha-, beta-, or gamma-radiation. For example, U.S. Pat. No. 5,811,822A describes a transparent optically stimulable glass composite to be used in dosimetry for the detection of ionizing radiation. The dosimeter can for example be worn by a person being monitored when used as a personal dosimeter or mounted onto a particular object and is a record of the radiation or illumination dose received. Modern electronic personal dosimeters can give a continuous readout of cumulative dose and current dose rate and can for example warn the wearer with a stimulus such as an audible alarm when a specified dose rate or a cumulative dose is exceeded. Other dosimeters, such as for example thermoluminescent or film types, require processing after use to reveal the cumulative dose received, and cannot give a current indication of dose while being worn.

Most radiation dosimeters relying on a charge transfer between dopant ions operate in such a way that only one unidirectional electron transfer between the dopant ions can be used to determine a light intensity. Such principle is for example described in the scientific publication of Oliveira L. C. et al. entitled "*Lanthanide-doped MgO: A case study on how to design new phosphors for dosimetry with tailored luminescent properties*" published in the Journal of Luminescence, vol. 209, pages 21-30, XP085616995. When illuminated with stimulation light emitted by a stimulation light source, the dosimeter releases the trapped energy in the form of light, the intensity of which is proportional to the intensity of the illumination the dosimeter was exposed to. This unidirectional charge transfer can be induced using only for example ionizing radiation or ultraviolet light. Such dosimeters are therefore only useful for ionizing radiation or for ultraviolet light.

Light illumination can for example be monitored by ultraviolet, visible or infrared light monitoring sensors which continuously measure light intensities. Such sensors comprise multiple electronic components including a sensor, a power source and electronics to handle the read-out and the data transmission of the measured light or radiation dose. The use of electronic components makes these light monitoring devices bulky and vulnerable to mechanical and water damage. Additionally, these multiple electronic components used for sensing and for read-out are necessarily combined in one single dosimeter. The light monitoring devices require continuous power during operation, making them prone to power failure or limiting the lifetime of the sensor to the typical lifetime of batteries. Additionally, most existing solutions require that the data, obtained in real-time, is either stored in yet another electronic component or immediately transmitted, thereby having a limited operating range determined either by physical connections, such as for example wired connections, or the location of the receiver for wireless solutions.

SUMMARY

It is thus an object of embodiments of the present invention to propose a method and a wireless light dosimeter comprising a light sensing device and a read-out device which do not show the inherent shortcomings of the prior art. More specifically, amongst others, it is an object of embodiments of the present invention to propose a method and a light dosimeter which offers a wireless, offline solution to measure cumulative light intensities in a highly reliable way and over a large spectral range and dynamic range.

The scope of protection sought for various embodiments of the invention is set out by the independent claims.

The embodiments and features described in this specification that do not fall within the scope of the independent claims, if any, are to be interpreted as examples useful for understanding various embodiments of the invention.

There is a need for a method and a light sensing device which can be used to measure light intensities spanning from the infrared to the ultraviolet spectrum, thereby allowing the use of such light sensing device for considerably longer wavelengths than prior art solutions.

Amongst others, it is an object of embodiments of the invention to provide a method and a read-out device to determine a light intensity measured by a light sensing device according to the present invention.

This object is achieved, according to a first example aspect of the present disclosure, by a light sensing device for measuring a light intensity, comprising:

a light sensitive layer comprising a phosphor into which two different types of dopant ions are incorporated, wherein one of the types of dopant ions is a first lanthanide and wherein the other one of the types of dopant ions is a second lanthanide different from the first lanthanide; wherein the dopant ions are in a first state and/or in a second state and wherein:

a charge transfer of the dopant ions from the first state to the second state happens when the light sensitive layer is exposed to a second light energy, and wherein the charge transfer of the dopant ions from the first state to the second state corresponds to a reverse charge transfer between the first lanthanide and the second lanthanide; and a charge transfer of the dopant ions from the second state to the first state happens when the light sensitive layer is exposed to a first light energy larger than the second light energy, wherein the first light energy corresponds to a wavelength comprised between 200 nm and 600 nm; and wherein the charge transfer of the dopant ions from said second state to the first state corresponds to a forward charge transfer between the first lanthanide and the second lanthanide;

one or more optical filters on top of the light sensitive layer and being used to tune a spectral response of the light sensing device; wherein the optical filters comprise a neutral density filter configured to allow tuning a dynamic range of the light sensing device;

and wherein:

when the dopant ions are in the second state after exposure of the light sensitive layer to the second light energy, the light sensitive layer is configured to measure a first light intensity, wherein the first light intensity is an intensity of light of the first light energy inducing the forward charge transfer between the first lanthanide and the second lanthanide bringing an amount of dopant ions from the second state to the first state; and when the dopant ions are in the first state after exposure of the light sensitive layer to the first light energy, the light sensitive layer is configured to measure a second light intensity, wherein the second light intensity is an intensity of light of the second light energy inducing the reverse charge transfer between the first lanthanide and the second lanthanide bringing an amount of dopant ions from the first state to the second state.

The light sensing device according to the first example aspect of the invention offers a wireless, offline solution to measure light intensities in a highly reliable way and over a large dynamic range. The light sensing device according to the first example aspect of the invention can indeed be used to measure light of a first light energy and can be used to measure light of a second light energy different from the first light energy, wherein the first light energy is larger than the second light energy. In other words, the light sensing device according to the first example aspect of the invention can operate based on a forward charge transfer between the two types of dopant ions, and the light sensing device according to the first example aspect of the invention can also operate based on a reverse charge transfer between the two types of dopant ions, wherein this reverse charge transfer is usually used only for read-out of light monitoring devices according to the prior art. Using this reverse charge transfer between the two types of dopant ions allows to use the device at considerably longer wavelengths, spanning a much wider spectrum than prior art devices spreading from ultraviolet to visible light to infrared light. In other words, the light sensitive layer according to a first example aspect of the invention is characterized by broad excitation and stimulation bands covering the whole visible and infrared spectrum or covering at least one or more preferred ranges of the visible and/or infrared spectrum. The spectral response of the light sensing device can therefore simply be tuned using optical filters and does not require a change in the light sensitive layer when a different spectral response is needed.

The light sensing device according to the first example aspect of the invention measures the total or integrated light intensity of the light of a first light energy or of a second light energy it is exposed to, thereby not needing data logging. The light sensing device according to the first example aspect of the invention is a passive detector, as information on the light intensity to which the light sensitive layer was exposed is stored inside the light sensitive layer. This information of the light intensity to which the light sensitive layer was exposed can be read-out for example at the end of the measurement. The light sensing device according to the first example aspect of the invention can then be reset to be re-used. The light sensing device according to the first example aspect of the invention has therefore an infinite amount of cycles of exposure to light of a first light energy and/or of a second light energy, read-out and reset. The light sensing device according to the first example aspect of the invention thereby demonstrates a large robustness and reusability.

A dopant, also called a doping agent, is a trace of impurity element that is introduced into the light sensitive layer to alter its original optical properties. An ion is an atom or molecule that has a net electrical charge. In other words, the net charge of an ion is non-zero due to its total number of electrons being unequal to its total number of protons. A dopant ion therefore is a trace of impurity element that is introduced into the light sensitive layer to alter its original optical properties and that has a non-null net charge. A charge transfer of the dopant ions from the first state to the second state happens when the light sensitive layer is exposed to a second light energy. In other words, the two different types of dopant ions are in a first state and upon exposing the light sensitive layer to light of a second light energy, a charge transfer is induced between the two different types of dopant ions, thereby bringing the two types of dopant ions into a second state. In the context of the present invention, this is referred to as a reverse charge transfer. For example, the charge transfer of the dopant ions from the first state to the second state corresponds to a transfer of one or more electrons from one type of dopant ions to the other type of dopant ions. Similarly, a charge transfer of the dopant ions from the second state to the first state happens when the light sensitive layer is exposed to a first light energy larger than the second light energy. In other words, the two different types of dopant ions are in the second state and upon exposing the light sensitive layer to light of a first light energy, wherein the first light energy is larger than the second light energy, a charge transfer is induced between the two different types of dopant ions, thereby bringing the two types of dopant ions into the first state. In the context of the present invention, this is referred to as a forward charge transfer. For example, the charge transfer of the dopant ions from the second state to the first state corresponds to a transfer of one or more electrons from one type of dopant ions to the other type of dopant ions.

The working principle of the light sensing device according to a first example aspect of the invention is based on this forward charge transfer and this reverse charge transfer between defects in the light sensitive layer. Exposure of the light sensitive layer to the first light energy induces a metastable electron transfer from one defect to another. Exposure of the light sensitive layer to the second light energy smaller than the first light energy induces a reverse electron transfer between the two types of dopant ions, yielding optically stimulated luminescence of the light sensitive layer characteristic to the types of dopant ions comprised herein. The total intensity of the optically stimulated luminescence is proportional to the net amount of forward transferred charges.

Based on this principle, the light sensing devices can be operated in two different ways.

A first operational mode is suited to measure first light intensities of light of the first light energy which is of high energy, such as for example ultraviolet to blue. Prior to the measurement, the light sensitive layer is exposed to light of the second light energy smaller than the first light energy to induce a charge transfer between the two types of dopant ions, thereby bringing the dopant ions from a first state to a second state, and to maximize an amount of dopant ions in the second state and minimize an amount of dopant ions in the first state. The light sensitive layer can then be seen as 'empty', wherein 'empty' does not necessarily mean that the amount of dopant ions in the first state is null. Then, during the measurement, the light sensitive layer is exposed to light of the first light energy which thereby induces the forward charge transfer between the two types of dopant ions bringing an amount of dopant ions from the second state to the first state, wherein the amount of dopant ions in the first state is proportional to the amount of light of the first light energy to which the light sensitive layer was exposed during the measurement. During the measurement, the light sensing device then measures a first light intensity of light of the first light energy. The light sensitive layer can then be seen as 'partially filled'. Then, during the read-out of the light sensitive layer, the intensity of the optically stimulated luminescence of the light sensitive layer is proportional to the amount of light of the first light energy to which the light sensitive layer was exposed during the measurement.

A second operational mode is suited to measure second light intensities of light of the second light energy which is of lower energy than the first light energy, such as for example green to infrared. Prior to the measurement, the light sensitive layer is exposed to light of the first light energy to induce a charge transfer between the two types of dopant ions, thereby bringing the dopant ions from a second state to a first state, and to maximize an amount of dopant ions in the first state and to minimize an amount of dopant ions in the second state. The light sensitive layer can then be seen as 'full' wherein 'full' does not necessarily mean that the amount of dopant ions in the first state is 100%. Then, during the measurement, the light sensitive layer is exposed to light of the second light energy which thereby induces the reverse charge transfer between the two types of dopant ions, bringing an amount of dopant ions from the first state to the second state, wherein the amount of dopant ions in the second state is proportional to the amount of light of the second light energy to which the light sensitive layer was exposed during the measurement. During the measurement, the light sensing device then measures a second light intensity of light of the second light energy. The light sensitive layer can then be seen as 'partially emptied'. Then, during the read-out of the light sensitive layer, the intensity of the optically stimulated luminescence of the light sensitive layer can be determined from the amount of light of the second light energy to which the light sensitive layer was exposed during the measurement. For example, the intensity of the optically stimulated luminescence of the light sensitive layer is related to the amount of light of the second light energy to which the light sensitive layer was exposed during the measurement.

The light of the first light energy to which the light sensing device is exposed when measuring the first light intensity does not necessarily have the same wavelength as the light used in the second operational mode to bring the dopant ions from a second state to a first state, and to maximize an amount of dopant ions in the first state and minimize an amount of dopant ions in the second state. The light of the second light energy to which the light sensing device is exposed when measuring the second light intensity does not necessarily have the same wavelength as the light used in the first operational mode to bring the dopant ions from a first state to a second state, and to maximize an amount of dopant ions in the second state and minimize an amount of dopant ions in the first state. For example, it is possible that the light sensing device is first stimulated by light at 800 nm or 808 nm at the start of the first operational mode, but that the light sensing device is used to measure a light intensity of light between 550 and 600 nm.

The light sensing device according to the first example aspect of the invention is free of any electronic component, thereby being resistant to water damage related for example to humidity and/or to mechanical damage. The light sensing device according to the first example aspect of the invention can therefore be used in any environment, even an environment with difficult and harsh conditions such as cold temperatures, humidity, vibrations, altitude, pressure, vacuum, etc. The light sensing device according to the first example aspect of the invention does not require any maintenance, thereby rendering its use easy and intuitive.

The light sensing device according to the first example aspect of the invention does not require an external power source. The light sensing device according to the first example aspect of the invention is completely standalone.

The light sensing device according to the first example aspect of the invention is wireless and does not require any data transmission, thereby unlimiting its operating range.

In the context of the present invention, light intensity is understood as luminous intensity. A light intensity is a measure of the wavelength-weighted power emitted in unit time by a light source in a particular direction per unit solid angle. A light intensity can be expressed in lumen, candela, Watts or can alternatively be expressed in units per meter square. In other words, a light intensity depends on the light source emitting the light and the direction in which it radiates light and on the wavelength of the light being emitted.

In the context of the present invention, a light energy is one form of electromagnetic radiation, such as for example infrared, visible light or ultraviolet. Each wavelength can be associated to a frequency. Light can also be associated with energy. The longer the wavelength, the less the energy, and vice versa. For example, visible light is less energetic than ultraviolet light, and more energetic than infrared radiation.

In the context of the present disclosure, the expression "proportional to" is not to be understood as limited to "being linearly proportional to".

In the context of the present invention, the light sensing device makes use of one or more optical filters positioned on top of the light sensitive layer. This way, the one or more optical filters allow to tune some properties of the light sensing device without requiring a change of light sensitive layer.

The light sensitive layer comprises a phosphor.

The light sensitive layer comprises a host matrix into which two different types of dopant ions are incorporated. The combination of the host matrix and dopants should provide charge transfer states that are stable at room temperature. Additionally, the combination of the host matrix and dopants should induce broad excitation bands comprised between 200 nm and 600 nm and broad stimulation bands covering the one or more ranges of the visible and/or one or more ranges the infrared spectrum. For example, the host matrix should be transparent for ultraviolet, visible and infrared light. For example, the host matrix comprises one or more of the following: aluminates, silicates, fluorides, sulfides. The light sensitive layer comprising the phosphor demonstrates a thickness for example smaller than 1 mm, preferably tens or hundreds of micrometers.

A phosphor is a chemical compound that emits light when it is exposed to radiation of a certain energy. Phosphors are used in many types of lighting, including fluorescent bulbs where they change the ultraviolet light produced by excited mercury vapor into visible light. The chemistry of phosphors varies greatly depending on what the phosphor is to be used for. Phosphors include 'glow-in-the-dark' materials that can be found in for example toys and emergency safety lighting for buildings or for planes or for trains. They are used in the screens of older style cathode ray tube televisions to make visible light from an electron beam. They can also be used to visibly detect ionizing radiation. Light-emitting diodes are devices that often use phosphors to obtain a particular color or color temperature.

Usually, the absorption of high-energy radiation is immediately followed by the emission of light. Depending on the type of excitation, the process is called photo- or radioluminescence. However, some phosphors can store part of the energy that is provided to them during excitation and when this energy is released, it can give rise to emission long after the excitation has stopped, at times that are considerably longer than the photo- or radioluminescence lifetimes. Persistent phosphors, or phosphor, also called glow-in-the-dark materials, are a specific type of luminescent materials. They are usually excited using blue or ultraviolet light. They can emit light long after the excitation ended, which is realized by temporarily storing energy in the crystal lattice. Exposing the phosphor to ambient heat can release the trapped charge carriers, after which recombination and light emission can occur. In other words, a phosphor possesses the ability to absorb high-energy radiation and convert it into light with a typically lower energy. Several materials are known to emit light for tens of hours after the end of the excitation, not only in the visible part of the electromagnetic spectrum, but also in the infrared, opening novel applications for example in the field of bioimaging, emergency signage, glowing road markings. Depending on the envisioned application of the light sensing device according to a first example aspect of the invention, the storage or afterglow properties of the light sensitive layer can be tuned by adding co-dopants or by slightly changing the host composition of the light sensitive layer.

The table below lists different examples of phosphors and their corresponding emission wavelengths:

| Phosphor | Emission wavelength $\lambda_{max}$ |
|---|---|
| $CaAl_2O_4$:Eu,Ln | 440 nm |
| $SrAl_2O_4$:Eu,Ln | 520 nm |
| $SrAl_2O_4$:Ce,Ln | 360 nm |
| CaS:Eu,Ln | 650 nm |
| CaS:Yb,Ln | 770 nm |
| SrS:Eu,Ln | 610 nm |
| $Sr_2MgSi_2O_7$:Eu,Ln | 470 nm |
| $CaF_2$:Eu,Ln | 430 nm |

The light sensing device according to the first example aspect of the invention therefore does not require the use of an external power source. The light sensing device according to the first example aspect of the invention makes use of the light sensitive layer to detect and measure the light intensities. Power is only required during read-out of the light sensing device and more particularly read-out of the light sensitive layer.

According to example embodiments, the first light energy corresponds to a first wavelength which is shorter than the emission wavelength of the phosphor.

The first light energy corresponds to a wavelength comprised between 200 nm and 600 nm. Alternatively, the first light energy corresponds to a first wavelength comprised between 200 nm and the emission wavelength of the phosphor.

According to example embodiments, the second light energy corresponds to a second wavelength which is longer than the emission wavelength of the phosphor.

Preferably, the second light energy for example corresponds to a wavelength comprised between 450 nm and 5 µm.

One of the types of dopant ions is a first lanthanide and wherein the other one of the types of dopant ions is a second lanthanide different from the first lanthanide.

One of the types of dopant ions is a first lanthanide and wherein the other one of the types of dopant ions is a second lanthanide different from the first lanthanide. For example, one of the types of dopant ions is cerium, Ce, or europium, Eu, or ytterbium, Yb, and wherein the other one of the types of dopant ions is a second lanthanide different from the first lanthanide. Alternatively, samarium, Sm, may be used to codope one type of lanthanide, for example europium, Eu, as this lanthanide is known to introduce deeper trapping defects which cannot be emptied spontaneously at room temperature, thereby stabilizing the energy storage in the light sensitive layer at room temperature.

Possible combinations of types of dopant ions are:
europium, samarium;
europium, thulium;
cerium, samarium;
cerium, thulium;
europium, dysprosium;
europium, neodymium;
ytterbium, samarium;
ytterbium, thulium.

The charge transfer of the dopant ions from the first state to the second state corresponds to a reverse charge transfer between the first lanthanide and the second lanthanide; and the charge transfer of the dopant ions from the second state to the first state corresponds to a forward charge transfer between the first lanthanide and the second lanthanide.

The charge transfer of the dopant ions from the first state to the second state for example corresponds to a transfer of one or more electrons between a first oxidation state of the first lanthanide and a first oxidation state of the second lanthanide, thereby generating a second oxidation state of the first lanthanide and a second oxidation state of the second lanthanide. Similarly, the charge transfer of the dopant ions from the second state to the first state for example corresponds to a transfer of one or more electrons between the second oxidation state of the first lanthanide and the second oxidation state of the second lanthanide, thereby generating back the first oxidation state of the first lanthanide and the first oxidation state of the second lanthanide.

According to example embodiments, the light sensing device further comprises a casing positioned between the light sensitive layer and the one or more optical filters when the light sensitive layer measures the first light intensity or when the light sensitive layer measures the second light intensity.

The casing is positioned on top of the light sensitive layer, and the one or more optical filters are positioned on top of the casing. The casing is therefore positioned between the light sensitive layer and the one or more optical filters when the light sensitive layer measures the first light intensity or when the light sensitive layer measures the second light intensity. The casing is for example a housing which comprises plastic, and/or metal, and/or glass, etc. The casing can have any shape and any thickness and is light-proof to light for the light sensitive layer which does not pass through the one or more optical filters. In other words, the casing is used to ensure the light sensitive layer is only exposed to light that has passed through the optical filters first when the light sensitive layer measures the first light intensity or when the light sensitive layer measures the second light intensity. The casing is transparent for light of the first light energy or for light of the second light energy. Alternatively, the casing can comprise one or more openings in order to guide the light that has passed through the optical filters towards the light sensitive layer. Alternatively, the one or more filters are positioned directly on top of the light sensitive layer.

According to example embodiments, the one or more optical filters comprise one or more of the following:
 a neutral density filter configured to allow tuning a dynamic range of the light sensing device;
 a color filter configured to allow selecting a wavelength range over which the light sensing device operates.

This way, the use of one or more optical filters allows to tune some properties of the light sensing device without needing to change the light sensitive layer. In other words, the one or more optical filters tune a spectral response of the light sensing device. Examples of possible wavelength ranges of light transmitted by these color filters are: 200 to 400 nm; 420 to 475 nm; 600 to 700 nm; 750 to 1000 nm. Additionally, the one or more optical filters prevent the light sensitive layer from switching between said first state and said second state too fast. Possible neutral density filters are filters with an optical density of, for example: 0.6; 1.2; 2.4; over the complete wavelength interval of interest.

According to example embodiments, the light sensing device is printed onto a flexible foil.

This way, the components of the light sensing device are flexible and can be cut to the desired shape or size. The light sensing device can therefore be made into any shape or size, thereby drastically improving the volatility of the light sensing device and making the light sensing device fully customizable. Manufacturing costs are low, thereby making the light sensing device rather cheap. This allows the use of the light sensing device as a disposable device, making it compatible with, and suitable for, for example biotech applications.

According to example embodiments, the light sensing device is 3D printed.

This way, the components of the light sensing device can be printed to the desired shape or size. The light sensing device can therefore be made into any shape or size, thereby drastically improving the volatility of the light sensing device and making the light sensing device fully customizable and durable.

According to a second example aspect, a read-out device is provided for determining a light intensity measured by a light sensing device according to a first example aspect, wherein the read-out device comprises:
 a stimulation light source configured to emit light of the second light energy and to expose the light sensitive layer to the second light energy, thereby allowing a charge transfer of the dopant ions from the first state to the second state; and
 an excitation light source configured to emit light of the first light energy and to expose the light sensitive layer to the first light energy, thereby allowing a charge transfer of the dopant ions from the second state to the first state.

The read-out device according to a second example aspect of the invention is independent from the light sensing device. In other words, the read-out device is not combined with the light sensing device in a single device. For example, the read-out device is a smartphone, or a tablet, or a smartwatch. Alternatively, the read-out device can be comprised in any suitable electronic device.

The stimulation light source is for example a laser or a laser-diode with an emission wavelength configured to allow read-out of the light sensing device by inducing the reverse charge transfer in the light sensitive layer that results in the optically stimulated luminescence of the light sensitive layer. This stimulation light source is also used to bring the light sensing device into the starting conditions needed for the first operational mode of the light sensing device, i.e. bringing the dopant ions from the first state to the second state, and maximizing an amount of dopant ions in the second state and minimizing an amount of dopant ions in the first state.

The excitation light source is for example a laser or a laser diode or a UVA/blue light-emitting diode with an emission wavelength configured to induce the forward electron transfer in the light sensitive layer. This excitation light source is also used to bring the light sensing device into the starting conditions needed for the second operational mode of the light sensing device, i.e. bringing the dopant ions from the second state to the first state, and maximizing an amount of dopant ions in the first state and minimizing an amount of dopant ions in the second state. In other words, the excitation source is used to trigger a reverse charge transfer between the first lanthanide and the second lanthanide. Triggering a reverse charge transfer in a light sensing device is not described in for example the prior art U.S. Pat. No. 5,811, 822A.

The light of the first light energy to which the light sensing device is exposed when measuring the first light intensity does not necessarily have the same wavelength as the light used in the second operational mode to bring the dopant ions from a second state to a first state, and to maximize an amount of dopant ions in the first state and minimize an amount of dopant ions in the second state. In other words, the light of the first light energy to which the light sensing device is exposed when measuring the first light intensity does not necessarily have the same wavelength as the light emitted by the excitation light source. The light of the second light energy to which the light sensing device is exposed when measuring the second light intensity does not necessarily have the same wavelength as the light used in the first operational mode to bring the dopant ions from a first state to a second state, and to maximize an amount of dopant ions in the second state and minimize an amount of dopant ions in the first state. In other words, the light of the second light energy to which the light sensing device is exposed when measuring the second light intensity does not necessarily have the same wavelength as the light emitted by the stimulation light source. For example, it is possible that the light sensing device is first stimulated by light at 800 nm or 808 nm at the start of the first operational mode, but that the light sensing device is used to measure a light intensity of light between 550 and 600 nm.

According to example embodiments, the read-out device further comprises:
  a sensor;
  a read-out optical filter positioned between the light sensitive layer and the sensor;
  wherein the sensor is configured to determine a read-out light intensity emitted by the light sensitive layer when the light sensitive layer is exposed to the second light energy of the stimulation light source;
  and wherein the read-out optical filter is configured to discriminate between the read-out light intensity and the second light energy of the stimulation light source when the light sensitive layer is exposed to the second light energy.

The first light intensity measured by the light sensitive layer can therefore be determined from the read-out light intensity emitted by the light sensitive layer and collected onto the sensor when the light sensitive layer is exposed to the second light energy of the stimulation light source. The second light intensity measured by the light sensitive layer can therefore be determined from the read-out light intensity emitted by the light sensitive layer and collected onto the sensor when the light sensitive layer is exposed to the second light energy of the stimulation light source.

The sensor of the read-out device is configured to record the read-out light intensity emitted by the light sensitive layer, for example the optically stimulated luminescence emitted by the light sensitive layer, when the light sensitive layer is exposed to the second light energy of the stimulation light source during read-out of the light sensitive layer. The sensor is for example a photodiode or a suitable camera.

The read-out optical filter is configured to discriminate between the read-out light intensity and the second light energy of the stimulation light source when the light sensitive layer is exposed to the second light energy. For example, the read-out optical filter is a band-pass filter, centered around the emission of the phosphor. Alternatively, the read-out optical filter is a short-pass with a cut-off wavelength located between the emission wavelength of the phosphor and the emission wavelength of the stimulation source or a notch filter. Alternatively, the read-out device comprises a plurality of read-out optical filters.

According to example embodiments, the read-out light intensity is an optically stimulated luminescence of the light sensitive layer; wherein:
  the optically stimulated luminescence corresponds to a first light intensity of light of the first light energy measured by the light sensitive layer; or
  a second light intensity of light of the second light energy measured by the light sensitive layer can be determined from the optical stimulated luminescence.

Optically stimulated luminescence, OSL, is a well-known phenomenon with important applications in e.g. medical imaging or geological and archeological dating. The light sensitive layers used in those applications are first exposed to high energy radiation, which induces trapping in the material and allows to store energy or information. This information can be read out at a later time, ranging from hours up to years after exposure. This read-out is accomplished by illuminating the light sensitive layers with radiation of lower energy, for example green, red or infrared light, which empties the traps, eventually leading to optically stimulated luminescence upon recombination at a luminescent center. It was shown that OSL during the excitation of the light sensitive layer, induced by the excitation light source, plays an important role during the charging of the phosphors such as persistent phosphors and that it is an important limiting factor of their storage capacity.

When the light sensing device operates in the first operational mode, the optically stimulated luminescence measured on the sensor of the read-out device during stimulation of the light sensitive layer by the stimulation light source corresponds to a light intensity of light of the first light energy measured by the light sensitive layer. In other words, in the first operational mode, the optically stimulated luminescence measured on the sensor of the read-out device during stimulation of the light sensitive layer by the stimulation light source is related to, for example proportional to, a light intensity of light of the first light energy measured by the light sensitive layer.

When the light sensing device operates in the second operational mode, the optically stimulated luminescence measured on the sensor of the read-out device during stimulation of the light sensitive layer by the stimulation light source corresponds to a light intensity of light of the second light energy measured by the light sensitive layer. In the second operational mode, the light sensitive layer must first be calibrated to determine the correspondence between the measured optically stimulated luminescence and the light intensity of light of the second light energy measured by the light sensitive layer. For example, prior to the exposure of the light sensitive layer to light of the second light energy, the light sensitive layer is exposed to light of the first light energy emitted by the excitation light source in order to maximize the amount of dopant ions in the first state and to minimize the amount of dopant ions in the second state, thereby saturating the light sensitive layer. Then the light sensitive layer is illuminated by light of the second light energy emitted by the stimulation light source in order to minimize the amount of dopant ions in the first state and to maximize the amount of dopant ions in the second state, thereby emptying the light sensitive layer, and the sensor is configured to measure a read-out light intensity of the light sensitive layer, for example the optically stimulated luminescence of the light sensitive layer while the light sensitive layer is illuminated by light of the second light energy. This provides a maximal read-out light intensity of the light sensitive layer. In the second operational mode, and after exposure of the light sensitive layer to light of the first light energy emitted by the excitation light source, a light intensity of light of the second light energy measured by the light sensitive layer can then be determined from the optically stimulated luminescence measured on the sensor of the read-out device during stimulation of the light sensitive layer by the stimulation light source, for example by subtracting the optically stimulated luminescence measured on the sensor from the maximal read-out light intensity of the light sensitive layer.

According to a third example aspect, a wireless light dosimeter is provided, wherein the wireless light dosimeter comprises one or more light sensing devices according to a first example aspect, and further comprising a read-out device according to a second example aspect.

The wireless light dosimeter according to the third example aspect of the invention comprises at least one light sensing device and at least one read-out device. The light sensing device and the read-out device are preferably not integrated or combined in the same device. In other words, the light sensing device and the read-out device are not physically combined in the same casing of the wireless light dosimeter. On the contrary, the wireless light dosimeter offers a modular design wherein the read-out device is separated from the one or more light sensing devices. In other words, the wireless light dosimeter is a system comprising one or more light sensing devices and a read-out device. This way, the read-out device which comprises one or more electronic components is independent from the light sensing device, as in not combined in the same device. This way, the light sensing device is rendered much less vulnerable or prone to mechanical damage or water damage than light sensing modules of prior art solutions were. This ensures the integrity of the read-out device is guaranteed during operation of the wireless light dosimeter, thereby expanding the lifetime of the wireless light dosimeter.

The wireless light dosimeter according to the third example aspect of the invention may comprise multiple light sensing devices according to a first example aspect of the invention. Each of the light sensing devices comprises one or more optical filters, wherein the one or more optical filters of one light sensing device of the wireless light dosimeter are different from the one or more optical filters of other light sensing devices of the wireless light dosimeter. This allows to increase the dynamic range of the wireless light dosimeter. This also allows to measure over multiple wavelength ranges to obtain spectral information, wherein each light sensing device is configured to measure different first and/or second light intensities than the other light sensing devices of the wireless light dosimeter.

According to a fourth example aspect, there is provided a method for determining a light intensity, comprising:
  providing a light sensitive layer comprising a phosphor into which two different types of dopant ions are incorporated, wherein one of the types of dopant ions is a first lanthanide and wherein the other one of the types of dopant ions is a second lanthanide different from the first lanthanide; wherein the dopant ions are in a first state and/or in a second state and wherein:
    a charge transfer of the dopant ions from the first state to the second state happens when the light sensitive layer is exposed to a second light energy, and wherein the charge transfer of the dopant ions from the first state to the second state corresponds to a reverse charge transfer between the first lanthanide and the second lanthanide; and
    a charge transfer of the dopant ions from the second state to the first state happens when the light sensitive layer is exposed to a first light energy larger than the second light energy, wherein the first light energy corresponds to a wavelength comprised between 200 nm and 600 nm; and wherein the charge transfer of the dopant ions from the second state to the first state corresponds to a forward charge transfer between the first lanthanide and the second lanthanide;
  providing one or more optical filters on top of the light sensitive layer and being used to tune a spectral response of the light sensing device wherein the optical filters comprise a neutral density filter configured to allow tuning a dynamic range of the light sensing device;
  and wherein the method further comprises:
  exposing the light sensitive layer to the second light energy, thereby bringing the dopant ions in the second state; and
  measuring with the light sensitive layer a first light intensity, wherein the first light intensity is an intensity of light of the first light energy inducing the forward charge transfer between the first lanthanide and the second lanthanide bringing an amount of dopant ions from the second state to the first state;
  or:
  exposing the light sensitive layer to the first light energy, thereby bringing the dopant ions in the first state; and
  measuring with the light sensitive layer a second light intensity, wherein the second light intensity is an intensity of light of the second light energy inducing the reverse charge transfer between the first lanthanide and the second lanthanide bringing an amount of dopant ions from the first state to the second state.

The method according to the fourth example aspect of the invention offers a wireless, offline solution to measure light intensities in a highly reliable way and over a large dynamic range and a large spectral range. The method according to the fourth example aspect of the invention can indeed be induced with light of a first light energy and can be induced with light of a second light energy different from the first light energy, wherein the first light energy is larger than the second light energy. In other words, the method according to the fourth example aspect of the invention can operate based on a forward charge transfer between the two types of dopant ions, and the method according to the fourth example aspect of the invention can operate based on a reverse charge transfer between the two types of dopant ions, wherein the reverse charge transfer is usually used only for read-out methods according to the prior art. Using this reverse charge transfer between the two types of dopant ions allows to operate at considerably longer wavelengths, spanning a much wider spectrum than prior art methods spreading from ultraviolet to visible light to infrared light. In other words, the method according to the fourth example aspect of the invention is characterized by broad excitation and stimulation bands covering the whole visible and infrared spectrum or covering at least one or more preferred ranges of the visible and/or infrared spectrum.

The method according to the fourth example aspect of the invention measures the total or integrated light intensity of the light of a first light energy or of a second light energy it is exposed to. The light sensitive layer is a passive detector, as information on the light intensity to which the light sensitive layer was exposed is stored inside the light sensitive layer. This information of the light intensity to which the light sensitive layer was exposed can be read-out, for example at the end of the measurement. The method according to the fourth example aspect of the invention can then be repeated an infinite amount of cycles of exposure to light of a first light energy or of a second light energy, read-out and reset.

A charge transfer of the dopant ions from the first state to the second state happens when the light sensitive layer is exposed to a second light energy. In other words, the two different types of dopant ions are in a first state and upon exposing the light sensitive layer to light of a second light energy, a charge transfer is induced between the two different types of dopant ions, thereby bringing the two types of dopant ions into a second state. In the context of the present invention, this is referred to as a reverse charge transfer. For example, the charge transfer of the dopant ions from the first state to the second state corresponds to a transfer of one or more electrons from one type of dopant ions to the other type of dopant ions. Similarly, a charge transfer of the dopant ions from the second state to the first state happens when the light sensitive layer is exposed to a first light energy larger than the second light energy. In other words, the two different types of dopant ions are in the second state and upon exposing the light sensitive layer to light of a first light energy, wherein the first light energy is larger than the second light energy, a charge transfer is induced between the two different types of dopant ions, thereby bringing the two types of dopant ions into the first state. In the context of the present invention, this is referred to as a forward charge transfer. For example, the charge transfer of the dopant ions from the second state to the first state corresponds to a transfer of one or more electrons from one type of dopant ions to the other type of dopant ions.

The method according to the fourth example aspect of the invention is based on this forward charge transfer and this reverse charge transfer between defects in the light sensitive layer. Exposure of the light sensitive layer to the first light energy induces a metastable electron transfer from one defect to another. Exposure of the light sensitive layer to the second light energy smaller than the first light energy induces a reverse electron transfer between the two types of dopant ions, yielding optically stimulated luminescence of the light sensitive layer characteristic to the types of dopant ions comprised herein. The total intensity of the optically stimulated luminescence is proportional to the net amount of forward transferred charges.

Based on this principle, the method according to the fourth example aspect of the invention operates in two different ways.

A first operational mode is suited to measure first light intensities of light of the first light energy which is of high energy, such as for example ultraviolet to blue. Prior to the measurement, the light sensitive layer is exposed to light of the second light energy smaller than the first light energy to induce a charge transfer between the two types of dopant ions, thereby bringing the dopant ions from a first state to a second state, and to maximize an amount of dopant ions in the second state and minimize an amount of dopant ions in the first state. The light sensitive layer can then be seen as 'empty', wherein 'empty' does not necessarily mean that the amount of dopant ions in the first state is null. Then, consecutively, during the measurement, the light sensitive layer is exposed to light of the first light energy which thereby induces the forward charge transfer between the two types of dopant ions bringing an amount of dopant ions from the second state to the first state, wherein the amount of dopant ions in the first state is proportional to the amount of light of the first light energy to which the light sensitive layer was exposed during the measurement. During the measurement, the light sensing device then measures a first light intensity of light of the first light energy. Then, during the read-out of the light sensitive layer, the light sensitive layer is exposed to light of the second light energy. The first light intensity can then be determined from the intensity of the optically stimulated luminescence of the light sensitive layer measured during the read-out of the light sensitive layer. During the read-out of the light sensitive layer, the intensity of the optically stimulated luminescence of the light sensitive layer is related to the amount of light of the first light energy to which the light sensitive layer was exposed during the measurement.

A second operational mode is suited to measure second light intensities of light of the second light energy which is of lower energy than the first light energy, such as for example green to infrared. Prior to the measurement, the light sensitive layer is exposed to light of the first light energy to induce a charge transfer between the two types of dopant ions, thereby bringing the dopant ions from a second state to a first state, and to maximize an amount of dopant ions in the first state and to minimize an amount of dopant ions in the second state. The light sensitive layer can then be seen as 'full' wherein 'full' does not necessarily mean that the amount of dopant ions in the first state is 100%. Then, consecutively, during the measurement, the light sensitive layer is exposed to light of the second light energy which thereby induces the reverse charge transfer between the two types of dopant ions, bringing an amount of dopant ions from the first state to the second state, wherein the amount of dopant ions in the second state is proportional to the amount of light of the second light energy to which the light sensitive layer was exposed during the measurement. During the measurement, the light sensing device then measures a second light intensity of light of the second light energy. The second light intensity can be determined for example by subtracting the intensity of the optically stimulated luminescence emitted by the light sensitive layer during the read-out of the light sensitive layer from a maximal read-out light intensity of the light sensitive layer. For example, the intensity of the optically stimulated luminescence of the light sensitive layer is related to the amount of light of the second light energy to which the light sensitive layer was exposed during the measurement. In other words, an amount of light of the second light energy to which the light sensitive layer was exposed during the measurement can be determined from the intensity of the optically stimulated luminescence of the light sensitive layer.

According to the method according to the present invention, when the light sensitive layer measures a first light intensity, wherein the first light intensity is an intensity of light of the first light energy, a casing is positioned between the light sensitive layer and the one or more optical filters. Similarly, when the light sensitive layer measures a second light intensity, wherein the second light intensity is an intensity of light of the second light energy, a casing is positioned between the light sensitive layer and the one or more optical filters. On the other hand, the light sensitive layer is directly exposed to light of the second light energy when inducing the charge transfer of the dopant ions from the first state to the second state with a stimulation light source prior to the measurement of light of the first light energy. Similarly, the light sensitive layer is directly exposed to light of the first light energy when inducing the charge transfer of the dopant ions from the second state to the first state with an excitation light source prior to the measurement of light of the second light energy. Similarly, the light sensitive layer is directly exposed to light of the second light energy of the stimulation light source when reading out the read-out light intensity emitted by the light sensitive layer.

According to example embodiments, the method further comprises the steps of:

providing a stimulation light source configured to emit light of the second light energy and to expose the light sensitive layer to the second light energy, thereby allowing a charge transfer of the dopant ions from the first state to the second state;

providing an excitation light source configured to emit light of the first light energy and to expose the light sensitive layer to the first light energy, thereby allowing a charge transfer of the dopant ions from the second state to the first state;

providing a sensor;

providing a read-out optical filter positioned between the light sensitive layer and the sensor;

and wherein the method further comprises:

when the light sensitive layer has measured the first light intensity or the second light intensity, illuminating the light sensitive layer with the stimulation light source, thereby inducing a charge transfer between the dopant ions; and collecting on the sensor an optically stimulated luminescence of the light sensitive layer stimulated by the stimulation light source, thereby determining the first light intensity or the second light intensity measured by the light sensitive layer.

According to example embodiments, the method further comprises one or more of the steps of:

prior to measuring the first light intensity with the light sensitive layer, illuminating the light sensitive layer with the stimulation light source, thereby minimizing an amount of the dopant ions in the first state in the light sensitive layer;

prior to measuring the second light intensity with the light sensitive layer, illuminating the light sensitive layer with the excitation light source, thereby maximizing an amount of the dopant ions in the first state in the light sensitive layer.

When the method operates in the first operational mode, the optically stimulated luminescence measured on the sensor of the read-out device during stimulation of the light sensitive layer by the stimulation light source corresponds to a light intensity of light of the first light energy measured by the light sensitive layer. In other words, in the first operational mode, the optically stimulated luminescence measured on the sensor of the read-out device during stimulation of the light sensitive layer by the stimulation light source is related to, for example proportional or directly proportional to, a light intensity of light of the first light energy measured by the light sensitive layer.

When the method operates in the second operational mode, the optically stimulated luminescence measured on the sensor of the read-out device during stimulation of the light sensitive layer by the stimulation light source corresponds to a light intensity of light of the second light energy measured by the light sensitive layer. In the second operational mode, the light sensitive layer must first be calibrated to determine the correspondence between the measured optically stimulated luminescence and the light intensity of light of the second light energy measured by the light sensitive layer. For example, prior to the exposure of the light sensitive layer to light of the second light energy, the light sensitive layer is exposed to light of the first light energy in order to maximize the amount of dopant ions in the first state and to minimize the amount of dopant ions in the second state, thereby saturating the light sensitive layer. Then the light sensitive layer is illuminated by light of the second light energy in order to minimize the amount of dopant ions in the first state and to maximize the amount of dopant ions in the second state, thereby emptying the light sensitive layer, and the sensor is configured to measure a read-out light intensity of the light sensitive layer, for example the optically stimulated luminescence of the light sensitive layer while the light sensitive layer is illuminated by light of the second light energy. This provides a maximal read-out light intensity of the light sensitive layer. In the second operational mode, and after exposure of the light sensitive layer to light of the first light energy, a light intensity of light of the second light energy measured by the light sensitive layer can then be determined from the optically stimulated luminescence measured on the sensor of the read-out device during stimulation of the light sensitive layer by the stimulation light source, for example by subtracting the optically stimulated luminescence measured on the sensor from the maximal read-out light intensity of the light sensitive layer.

BRIEF DESCRIPTION OF THE DRAWINGS

Some example embodiments will now be described with reference to the accompanying drawings.

FIG. 5A schematically illustrates the first operational mode of the light sensing device.

FIG. 5B schematically illustrates the second operation mode of the light sensing device.

FIG. 9, including FIGS. 9(a) and 9(b), schematically illustrates the absorptance of dopant ions in an example embodiment of the light sensitive layer according to the present disclosure.

DETAILED DESCRIPTION OF EMBODIMENT(S)

Figure 1B:
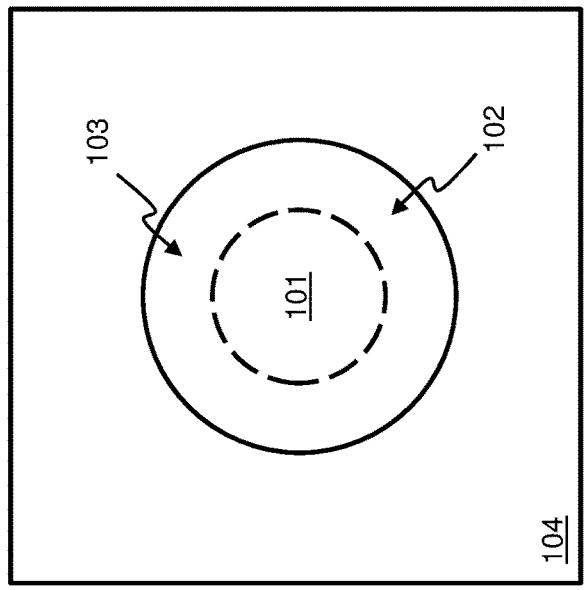
FIGS. 1A and 1B respectively depict a side view and a top view of an example embodiment of a light sensing device according to the present disclosure.
Figure 1A:
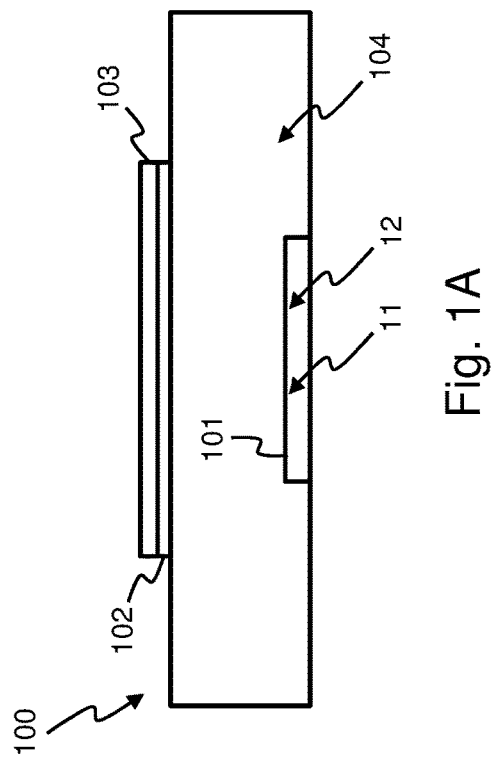

FIG. 1A schematically depicts a side view of an example embodiment of a light sensing device 100 according to the present invention. The light sensing device 100 comprises a light sensitive layer 101, two optical filters 102; 103 and a casing 104 positioned between the light sensitive layer 101 and the two optical filters 102; 103 used to tune a spectral response of the light sensing device 100. The optical filters comprise a neutral density filter configured to allow tuning a dynamic range of the light sensing device. The light sensitive layer 101 comprises two different types of dopant ions 11; 12, wherein the dopant ions 11; 12 are in a first state and/or in a second state and wherein:
- a charge transfer of the dopant ions 11; 12 from the first state to the second state happens when the light sensitive layer 101 is exposed to a second light energy; and
- a charge transfer of the dopant ions 11; 12 from the second state to the first state happens when the light sensitive layer 101 is exposed to a first light energy larger than the second light energy.

Figure 1C:
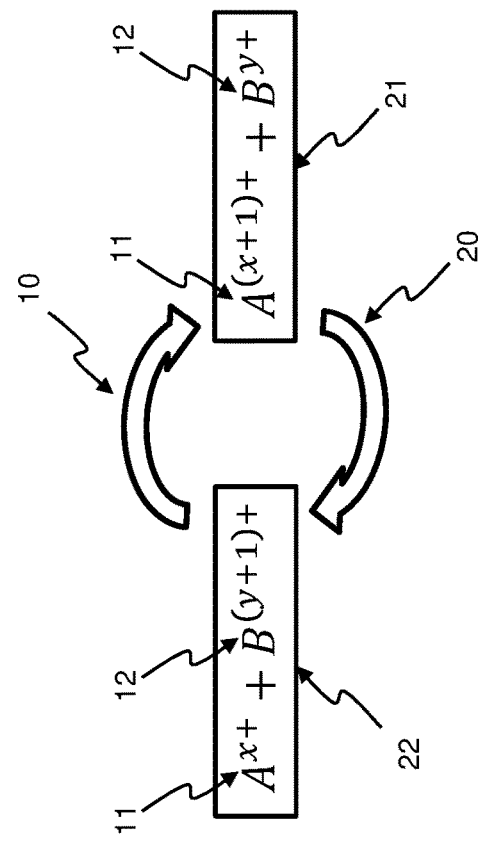
FIG. 1C schematically illustrates an example embodiment of a switch of the two different types of dopant ions of the light sensitive layer between a first state and a second state.

As illustrated in FIG. 1C, a charge transfer of the dopant ions 11; 12 from the first state 21 to the second state 22 happens when the light sensitive layer is exposed to light of a second light energy 20 and a charge transfer of the dopant ions 11; 12 from the second state 22 to the first state 21 happens when the light sensitive layer is exposed to light of a first light energy 10 larger than the second light energy 20. The light sensitive layer 101 of FIG. 1A comprises a phosphor. One type of dopant ions 11 is a first lanthanide and the other type of dopant ions 12 is a second lanthanide different from the first lanthanide. A charge transfer of the dopant ions 11; 12 from a first state to a second state corresponds to a charge transfer between the first lanthanide and the second lanthanide. For example, one type of dopant ions 11 is europium and one type of dopant ions 12 is samarium. A second state of the two different types of dopant ions 11; 12 is then:

A first state of the two different types of dopant ions 11; 12 is then:

Switching back and forth between the first state and the second state of the dopant ions 11; 12 corresponds to transferring a charge between the dopant ions 11; 12 as follows:

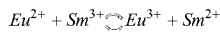

A charge transfer of the dopant ions 11; 12 from the first state to the second state happens when the light sensitive layer 101 is exposed to a second light energy such as for example green or infrared light. For example, light of a second light energy has a wavelength larger than the emission wavelength of the phosphor of the light sensitive layer 101. For example, light of a second light energy has a wavelength comprised between 450 nm and 5 µm. A charge transfer of the dopant ions 11; 12 from the second state to the first state happens when the light sensitive layer 101 is exposed to a first light energy larger than the second light energy such as for example blue or ultraviolet light. For example, light of a first light energy corresponds to a wavelength shorter than the emission wavelength of the phosphor of the light sensitive layer 101. For example, light of a first light energy has a wavelength comprised between 200 nm and 600 nm. The optical filter 102 is a neutral density filter configured to allow tuning a dynamic range of the light sensing device 100. The optical filter 103 is a color filter configured to allow selecting a wavelength range over which the light sensing device 100 operates. When the dopant ions 11; 12 are in the second state after exposure of the light sensitive layer 101 to the second light energy, the light sensitive layer 101 is configured to measure a first light intensity, wherein the first light intensity is an intensity of light of the first light energy inducing the forward charge transfer between the first lanthanide and the second lanthanide bringing an amount of dopant ions 11; 12 from the second state 22 to the first state 21. When the dopant ions 11; 12 are in the first state after exposure of the light sensitive layer 101 to the first light energy, the light sensitive layer 101 is configured to measure a second light intensity, wherein the second light intensity is an intensity of light of the second light energy inducing the reverse charge transfer between the first lanthanide and the second lanthanide bringing an amount of dopant ions 11; 12 from the first state 21 to the second state 22. FIG. 1B schematically depicts a top view of an example embodiment of a light sensing device 100 according to the present invention. Components having identical reference numbers than on FIG. 1A fulfill the same function. The optical filters 102; 203 and the light sensitive layer 101 can be of any shape, such as for example circular as depicted on FIG. 1B, or rectangular, etc.

Figure 2:
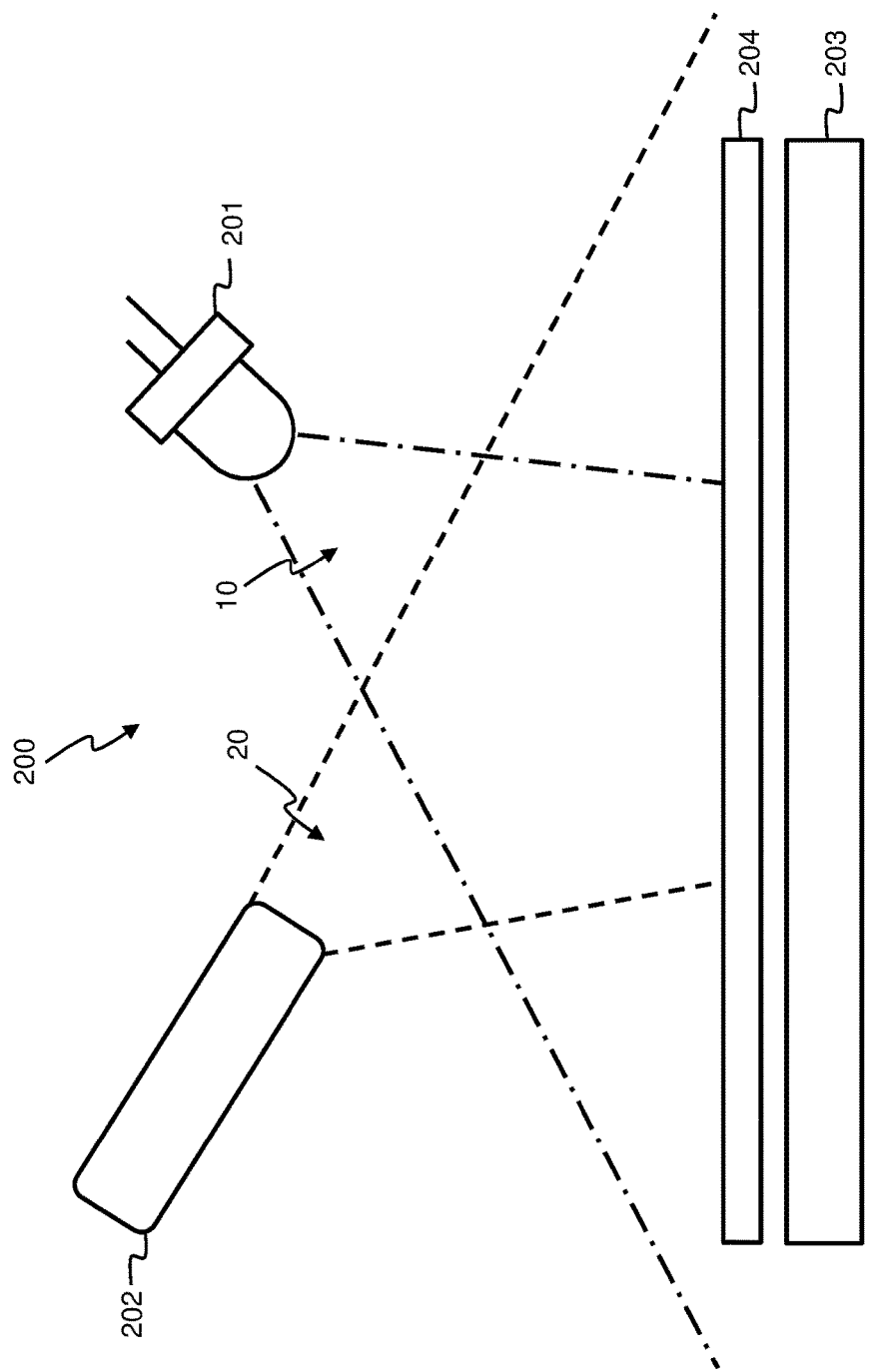
FIG. 2 depicts an example embodiment of a read-out device according to the present disclosure.

FIG. 2 schematically illustrates an example embodiment of a read-out device 200 according to the present invention. The read-out device 200 comprises a stimulation light source 202, an excitation light source 201, a sensor 203 and a read-out optical filter 204. The stimulation light source 202 is configured to emit light of the second light energy 20 and to expose for example the light sensitive layer of the light sensing device of FIG. 1A to the second light energy 20, thereby allowing a charge transfer of the dopant ions of the light sensitive layer of the light sensing device from the first state to the second state. The excitation light source 201 is configured to emit light of the first light energy 10 and to expose for example the light sensitive layer of the light sensing device of FIG. 1A to the first light energy 10, thereby allowing a charge transfer of the dopant ions of the light sensitive layer of the light sensing device from the second state to the first state. The read-out optical filter 204 is positioned between the stimulation light source 202 and the sensor 203 and is positioned between the excitation light source 201 and the sensor 203. The read-out optical filter 204 discriminates between the read-out light intensity and the second light energy 20 of the stimulation light source 202 when the light sensing device 100 is exposed to the second light energy 20, thereby filtering the light of second light energy 20 of the stimulation light source 202 and allowing to collect only the read-out light intensity of the light sensitive layer 101 on the sensor 203.

Figure 3:
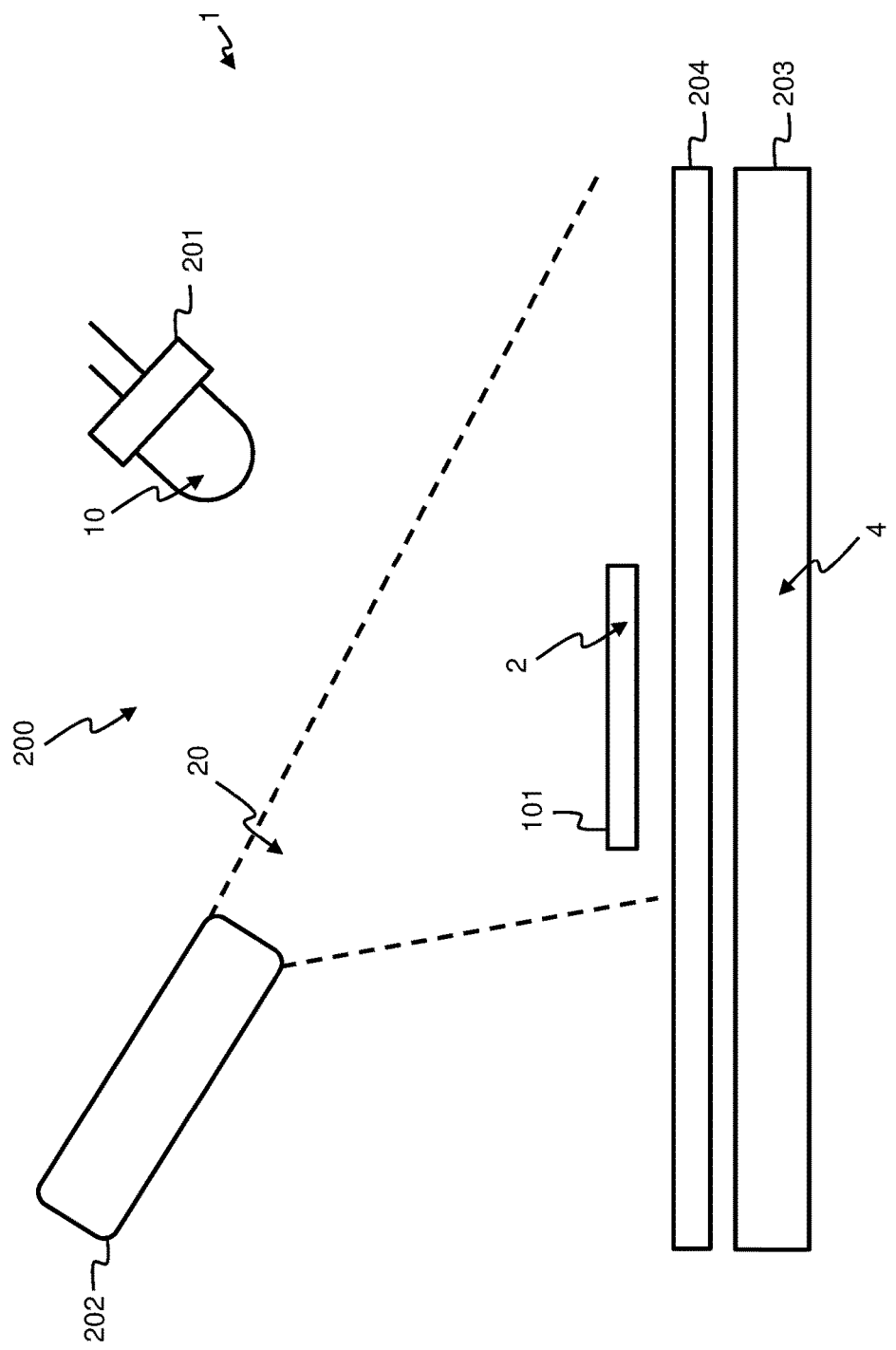
FIG. 3 depicts an example embodiment of a light sensitive layer and a read-out device according to the present disclosure.

FIG. 3 schematically illustrates an example embodiment of a wireless light dosimeter 1 according to the present invention. Components having identical reference numbers than on FIG. 1A or FIG. 1B or FIG. 1C or FIG. 2 fulfill the same function. The wireless light dosimeter 1 comprises a light sensing device 100 and a read-out device 200. The wireless light dosimeter 1 is depicted during read-out of the light sensitive layer 100 by the read-out device 200 as further described in detail in FIGS. 5A and 5B. During this read-out of the light sensitive layer 100, the one or more filters 102; 103 used to tune a spectral response of the light sensing device 100 are not positioned on top of the light sensitive layer 100 and are therefore not schematically depicted on FIG. 3. The optical filters comprise a neutral density filter configured to allow tuning a dynamic range of the light sensing device. The light sensitive layer 101 comprises two different types of dopant ions 11; 12, wherein the dopant ions 11; 12 are in a first state and/or in a second state and wherein:

a charge transfer of the dopant ions 11; 12 from the first state to the second state happens when the light sensitive layer 101 is exposed to a second light energy; and a charge transfer of the dopant ions 11; 12 from the second state to the first state happens when the light sensitive layer 101 is exposed to a first light energy larger than the second light energy.

The light sensitive layer 101 comprises a phosphor. One type of dopant ions 11 is a first lanthanide and the other type of dopant ions 12 is a second lanthanide different from the first lanthanide. A charge transfer of the dopant ions 11; 12 from a first state to a second state corresponds to a charge transfer between the first lanthanide and the second lanthanide. For example, one type of dopant ions 11 is europium and one type of dopant ions 12 is samarium. A first state of the two different types of dopant ions 11; 12 is then:

A second state of the two different types of dopant ions 11; 12 is then:

Switching back and forth between the first state and the second state of the dopant ions 11; 12 corresponds to transferring a charge between the dopant ions 11; 12 as follows:

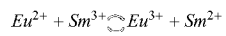

A charge transfer of the dopant ions 11; 12 from the first state to the second state happens when the light sensitive layer 101 is exposed to a second light energy such as for example green or infrared light. For example, light of a second light energy has a wavelength larger than the emission wavelength of the phosphor of the light sensitive layer 101. For example, light of a second light energy has a wavelength comprised between 450 nm and 5 μm. A charge transfer of the dopant ions 11; 12 from the second state to the first state happens when the light sensitive layer 101 is exposed to a first light energy larger than the second light energy such as for example blue or ultraviolet light and corresponding to a wavelength comprised between 200 nm and 600 nm. For example, light of a first light energy corresponds to a wavelength shorter than the emission wavelength of the phosphor of the light sensitive layer 101. For example, light of a first light energy has a wavelength comprised between 200 nm and 600 nm. When the dopant ions 11; 12 are in the second state after exposure of the light sensitive layer 101 to the second light energy, the light sensitive layer 101 is configured to measure a first light intensity 2, wherein the first light intensity 2 is an intensity of light of the first light energy inducing the forward charge transfer between the first lanthanide and the second lanthanide bringing an amount of dopant ions 11; 12 from the second state 22 to the first state 21. When the dopant ions 11; 12 are in the first state after exposure of the light sensitive layer 101 to the first light energy, the light sensitive layer 101 is configured to measure a second light intensity, wherein the second light intensity is an intensity of light of the second light energy inducing the reverse charge transfer between the first lanthanide and the second lanthanide bringing an amount of dopant ions 11; 12 from the first state 21 to the second state 22. The read-out device 200 comprises a stimulation light source 202, an excitation light source 201, a sensor 203 and a read-out optical filter 204. The stimulation light source 202 is configured to emit light of the second light energy 20 and to expose for example the light sensitive layer of the light sensing device of FIG. 1A to the second light energy 20, thereby allowing a charge transfer of the dopant ions of the light sensitive layer of the light sensing device from the first state to the second state. The excitation light source 201 is configured to emit light of the first light energy 10 and to expose for example the light sensitive layer of the light sensing device of FIG. 1A to the first light energy 10, thereby allowing a charge transfer of the dopant ions of the light sensitive layer of the light sensing device from the second state to the first state. The read-out optical filter 204 is positioned between the light sensing device 101 and the sensor 203. The sensor 203 is configured to determine a read-out light intensity 4 emitted by the light sensitive layer 101 when the light sensing device 100 is exposed to the second light energy 20 of the stimulation light source 202. The read-out optical filter 204 discriminates between the read-out light intensity 4 and the second light energy 20 of the stimulation light source 202 when the light sensing device 100 is exposed to the second light energy 20, thereby filtering the light of second light energy 20 of the stimulation light source 202 and allowing to collect only the read-out light intensity 4 of the light sensitive layer 101 on the sensor 203. The read-out light intensity 4 is an optically stimulated luminescence of the light sensitive layer 101. The optically stimulated luminescence of the light sensitive layer 101 corresponds to a light intensity 2 of light of the first light energy 10 measured by the light sensitive layer 101. Alternatively, the light intensity of light of the second energy 20 measured by the light sensitive layer 101 can be determined from the optically stimulated luminescence.

Figure 4:
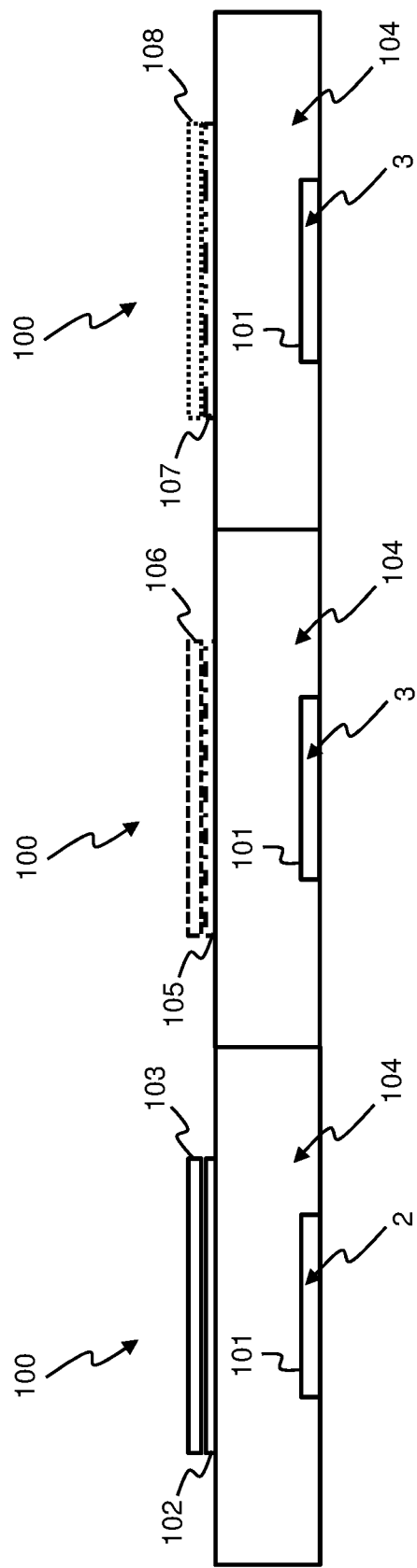
FIG. 4 depicts an example embodiment of a wireless light dosimeter according to the present disclosure, wherein the wireless light dosimeter comprises a plurality of light sensing devices.

FIG. 4 schematically illustrates an example embodiment of a wireless light dosimeter 1 according to the present invention. Components having identical reference numbers than on FIG. 1A or FIG. 1B or FIG. 1C or FIG. 2 or FIG. 3 fulfill the same function. The wireless light dosimeter 1 comprises a plurality of light sensing devices 100. Each light sensing device 100 comprises a light sensitive layer 101, two optical filters 102; 103; 105; 106; 107; 108 and a casing 104 positioned between the light sensitive layer 101 and the two optical filters 102; 103; 105; 106; 107; 108 used to tune a spectral response of the light sensing devices 100. The optical filters comprise a neutral density filter configured to allow tuning a dynamic range of the light sensing device. The light sensitive layer 101 comprises two different types of dopant ions 11; 12, wherein the dopant ions 11; 12 are in a first state and/or in a second state and wherein:

a charge transfer of the dopant ions 11; 12 from the first state to the second state happens when the light sensitive layer 101 is exposed to a second light energy; and a charge transfer of the dopant ions 11; 12 from the second state to the first state happens when the light sensitive layer 101 is exposed to a first light energy larger than the second light energy.

The light sensitive layer 101 comprises a phosphor. One type of dopant ions 11 is a first lanthanide and the other type of dopant ions 12 is a second lanthanide different from the first lanthanide. A charge transfer of the dopant ions 11; 12 from a first state to a second state corresponds to a charge transfer between the first lanthanide and the second lanthanide. For example, one type of dopant ions 11 is europium and one type of dopant ions 12 is samarium. A first state of the two different types of dopant ions 11; 12 is then:

A second state of the two different types of dopant ions 11; 12 is then:

Switching back and forth between the first state and the second state of the dopant ions 11; 12 corresponds to transferring a charge between the dopant ions 11; 12 as follows:

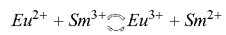

A charge transfer of the dopant ions 11; 12 from the first state to the second state happens when the light sensitive layer 101 is exposed to a second light energy such as for example green or infrared light. For example, light of a second light energy has a wavelength larger than the emission wavelength of the phosphor of the light sensitive layer 101. For example, light of a second light energy has a wavelength comprised between 450 nm and 5 µm. A charge transfer of the dopant ions 11; 12 from the second state to the first state happens when the light sensitive layer 101 is exposed to a first light energy larger than the second light energy such as for example blue or ultraviolet light and corresponding to a wavelength comprised between 200 nm and 600 nm. For example, light of a first light energy corresponds to a wavelength shorter than the emission wavelength of the phosphor of the light sensitive layer 101. For example, light of a first light energy has a wavelength comprised between 200 nm and 600 nm. The optical filters 102; 105; 107 are different neutral density filters configured to allow tuning a dynamic range of the light sensing device 100. The optical filters 103; 106; 108 are different color filter configured to allow selecting a wavelength range over which the light sensing device 100 operates. When the dopant ions 11; 12 are in the second state after exposure of the light sensitive layer 101 to the second light energy, the light sensitive layer 101 is configured to measure a first light intensity 2, wherein the first light intensity 2 is an intensity of light of the first light energy inducing the forward charge transfer between the first lanthanide and the second lanthanide bringing an amount of dopant ions 11; 12 from the second state 22 to the first state 21. When the dopant ions 11; 12 are in the first state after exposure of the light sensitive layer 101 to the first light energy, the light sensitive layer 101 is configured to measure a second light intensity 3, wherein the second light intensity 3 is an intensity of light of the second light energy inducing the reverse charge transfer between the first lanthanide and the second lanthanide bringing an amount of dopant ions 11; 12 from the first state 21 to the second state 22.

FIG. 5A schematically illustrates the first operational mode of the light sensing device. Components having identical reference numbers than on FIG. 1A or FIG. 1B or FIG. 1C or FIG. 2 or FIG. 3 or FIG. 4 fulfill the same function. First, the light sensitive layer 101 is exposed to light of the second light energy 20, thereby inducing a charge transfer of the dopant ions of the light sensitive layer 101 from the first state to the second state. Then, the light sensing device 100 comprising the light sensitive layer 101 and one or more optical filters 102; 103 used to tune a spectral response of the light sensing device 100—wherein the optical filters comprise a neutral density filter configured to allow tuning a dynamic range of the light sensing device—and a casing 104 positioned between the light sensitive layer 101 and the one or more optical filters 102; 103 measures a first light intensity 2 of light of the first light energy 10 which induces a charge transfer of the dopant ions of the light sensitive layer 101 from the second state to the first state. Then, the light sensitive layer 101 is exposed to light of the second light energy 20, for example light emitted by the stimulation light source of the read-out device, in order to read-out the first light intensity 2 measured by the light sensitive layer 101. FIG. 5B schematically illustrates the second operational mode of the light sensing device. Components having identical reference numbers than on FIG. 1A or FIG. 1B or FIG. 1C or FIG. 2 or FIG. 3 or FIG. 4 fulfill the same function. First, the light sensitive layer 101 is exposed to light of the first light energy 10, thereby inducing a charge transfer of the dopant ions of the light sensitive layer 101 from the second state to the first state. Then, the light sensing device 100 comprising the light sensitive layer 101 and one or more optical filters 102; 103 and a casing 104 positioned between the light sensitive layer 101 and the one or more optical filters 102; 103 measures a second light intensity 3 of light of the second light energy 20 which induces a charge transfer of the dopant ions of the light sensitive layer 101 from the first state to the second state. Then, the light sensitive layer 101 is exposed to light of the second light energy 20, for example light emitted by the stimulation light source of the read-out device, in order to read-out the second light intensity 3 measured by the light sensitive layer 101.

Figure 6:
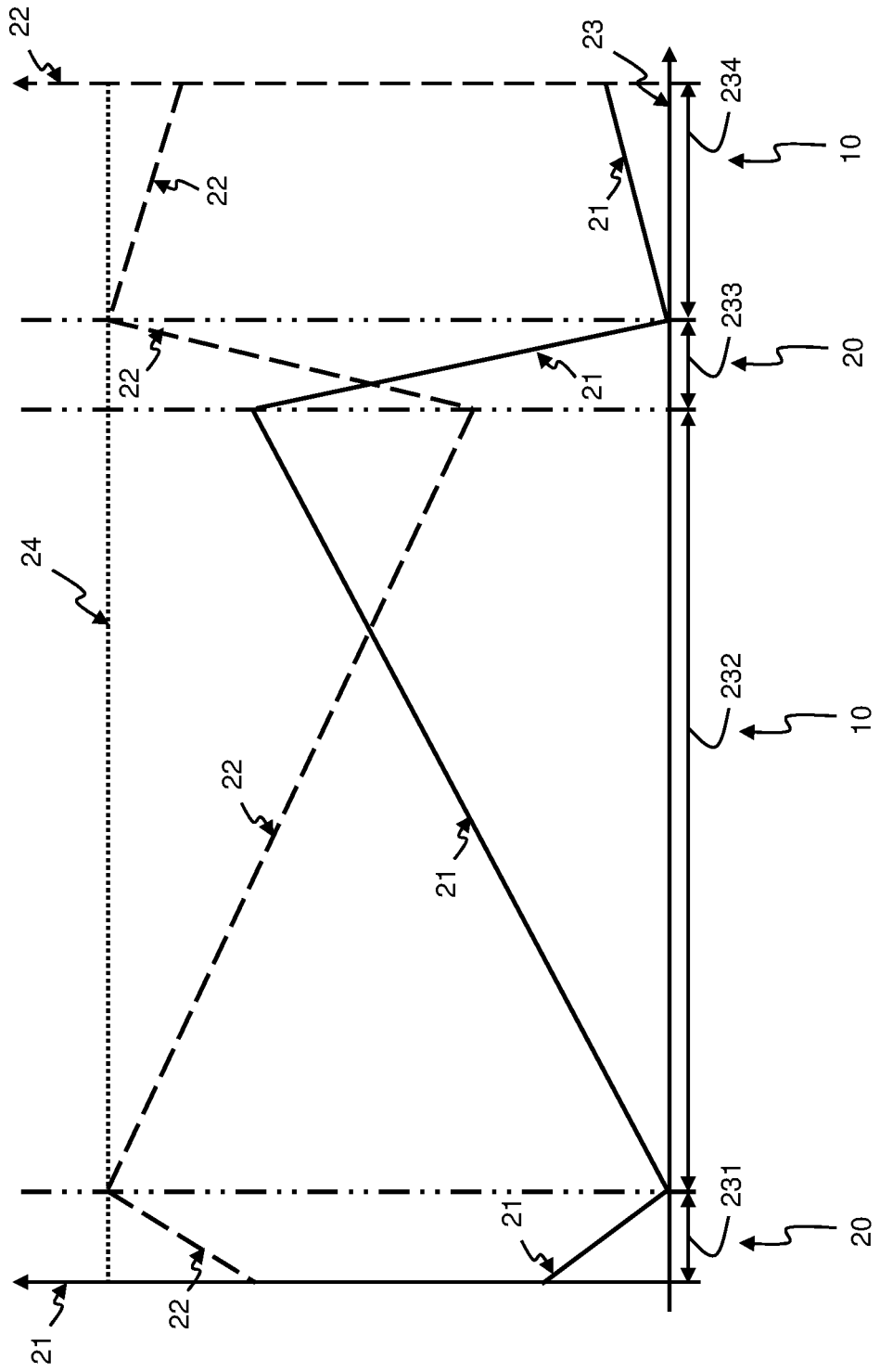
FIG. 6 schematically depicts charge transfers between dopant ions between a first state and a second state during a first operational mode of the light sensing device.

FIG. 6 schematically depicts charge transfers between dopant ions between a first state 21 and a second state 22 during a first operational mode of the light sensing device as a function of time 23. Components having identical reference numbers than on FIG. 1A or FIG. 1B or FIG. 1C or FIG. 2 or FIG. 3 or FIG. 4 or FIG. 5A or 5B fulfill the same function. A light sensitive layer comprises a total amount 24 of dopant ions. First, during the duration 231, the light sensitive layer is exposed to light of the second light energy 20, thereby inducing a charge transfer of the dopant ions of the light sensitive layer 101 from the first state 21 to the second state 22, until an amount of dopant ions in the first state 21 is minimized and an amount of dopant ions in the second state 22 is maximized. FIG. 6 depicts an example embodiment wherein the conversion of the dopant ions is complete after the duration 231. According to an alternative embodiment, the conversion of the dopant ions can be partial as the amount of dopant ions in the second state after the duration 231 is not necessarily 100%. Then, during the duration 232, the light sensing device 100 comprising the light sensitive layer 101 and one or more optical filters 102; 103 and a casing 104 positioned between the light sensitive layer 101 and the one or more optical filters 102; 103 measures a first light intensity of light of the first light energy 10 which induces a charge transfer of the dopant ions of the light sensitive layer 101 from the second state 22 to the first state 21 and which corresponds to a wavelength comprised between 200 nm and 600 nm. Then, during the duration 233, the light sensitive layer 101 is exposed to light of the second light energy 20, for example light emitted by the stimulation light source of the read-out device, in order to read-out the first light intensity measured by the light sensitive layer 101. During the duration 233, light of the second light energy 20 induces a charge transfer of the dopant ions of the light sensitive layer 101 from the first state 21 to the second state 22, until an amount of dopant ions in the first state 21 is minimized and an amount of dopant ions in the second state 22 is maximized. Then, in the duration 234, the light sensing device for example is being re-used to further measures a new first light intensity of light of the first light energy 10.

Figure 7:
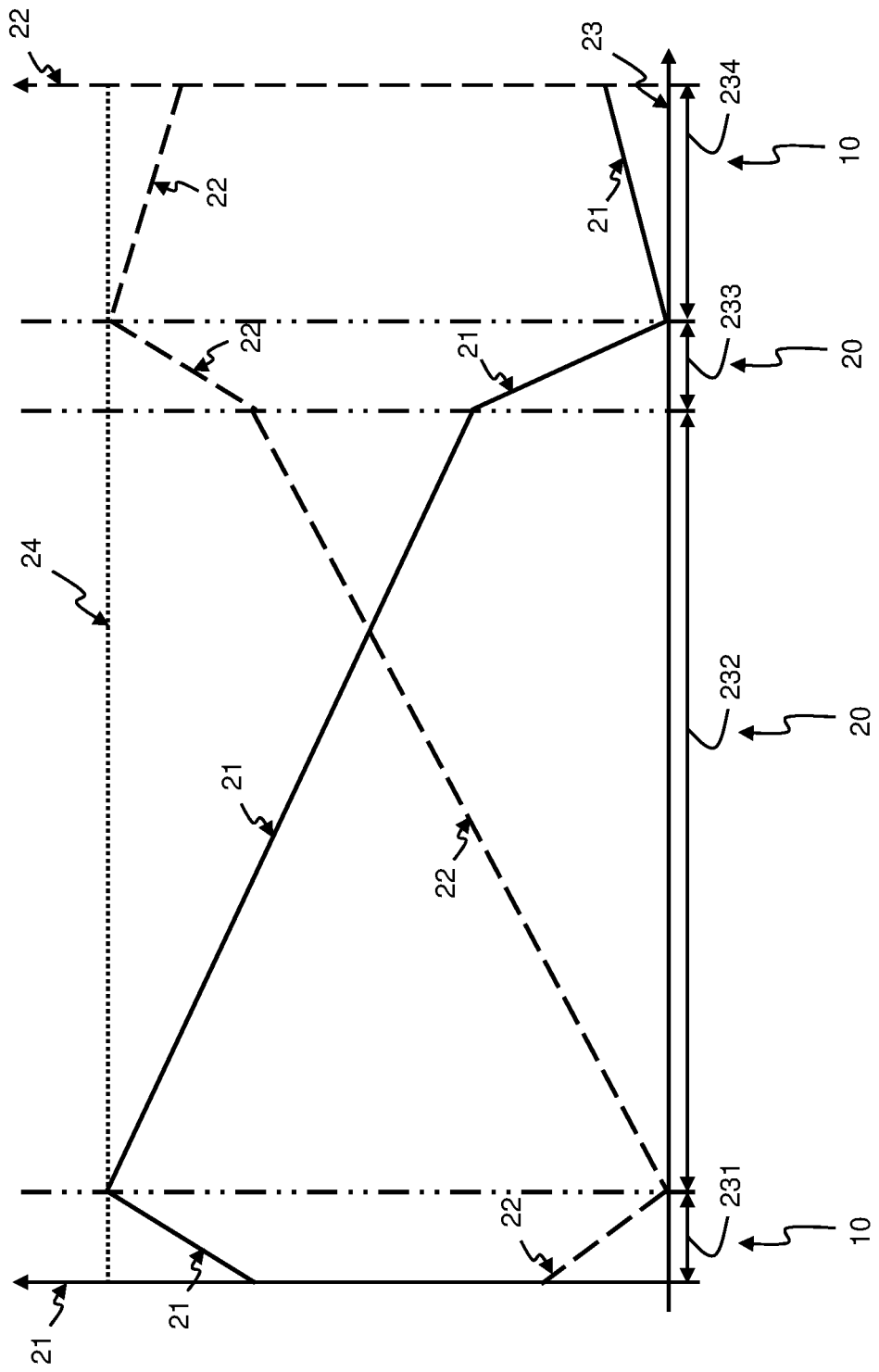
FIG. 7 schematically depicts charge transfers between dopant ions between a first state and a second state during a second operational mode of the light sensing device.

FIG. 7 schematically depicts charge transfers between dopant ions between a first state 21 and a second state 22 during a second operational mode of the light sensing device as a function of time 23. Components having identical reference numbers than on FIG. 1A or FIG. 1B or FIG. 1C or FIG. 2 or FIG. 3 or FIG. 4 or FIG. 5A or 5B or FIG. 6 fulfill the same function. A light sensitive layer comprises a total amount 24 of dopant ions. First, during the duration 231, the light sensitive layer is exposed to light of the first light energy 10 corresponding to a wavelength comprised between 200 nm and 600 nm, thereby inducing a charge transfer of the dopant ions of the light sensitive layer 101 from the second state 22 to the first state 21, until an amount of dopant ions in the first state 21 is maximized and an amount of dopant ions in the second state 22 is minimized. FIG. 7 depicts an example embodiment wherein the conversion of the dopant ions is complete after the duration 231. According to an alternative embodiment, the conversion of the dopant ions can be partial as the amount of dopant ions in the first state after the duration 231 is not necessarily 100%. Then, during the duration 232, the light sensing device 100 comprising the light sensitive layer 101 and one or more optical filters 102; 103 and a casing 104 positioned between the light sensitive layer 101 and the one or more optical filters 102; 103 measures a second light intensity of light of the second light energy 20 which induces a charge transfer of the dopant ions of the light sensitive layer 101 from the first state 21 to the second state 22. Then, during the duration 233, the light sensitive layer 101 is exposed to light of the second light energy 20, for example light emitted by the stimulation light source of the read-out device, in order to read-out the second light intensity measured by the light sensitive layer 101. During the duration 233, light of the second light energy 20 induces a charge transfer of the dopant ions of the light sensitive layer 101 from the first state 21 to the second state 22, until an amount of dopant ions in the first state 21 is minimized and an amount of dopant ions in the second state 22 is maximized. Then, in the duration 234, the light sensing device for example is being re-used to further measures a new first light intensity of light of the first light energy 10.

Figure 8:
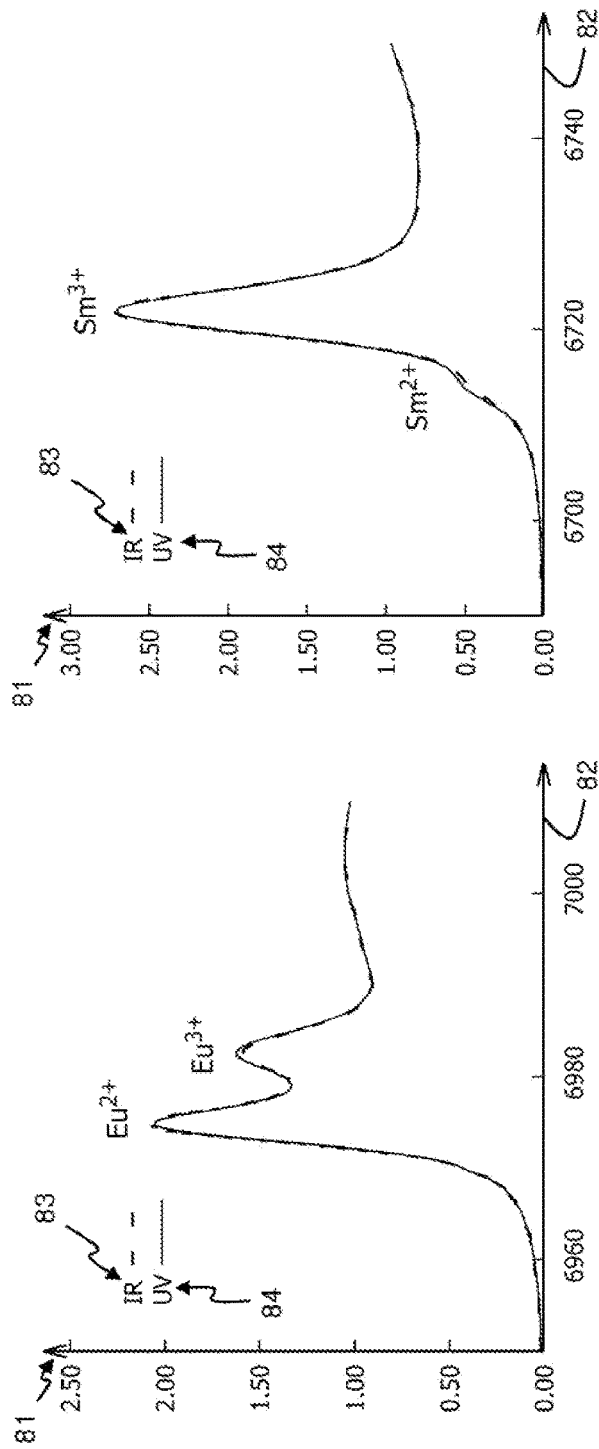
FIG. 8, including FIGS. 8(a) to 8(d), schematically illustrates the effects of illumination on an example embodiment of the light sensitive layer according to the present disclosure.

FIG. 8 schematically illustrates the effects of illumination on an example embodiment of the light sensitive layer according to the present disclosure. FIGS. 8(a) and (c) illustrate Eu $L_3$ and Sm $L_3$ XANES spectra under illumination with an ultraviolet laser 84 and with an infrared laser 83, by depicting the absorption intensity 81 as a function of the energy 82 of the X-rays used in the absorption measurement. FIGS. 8(b) and (d) illustrate the difference between both spectra recorded with an ultraviolet laser 84 and with an infrared laser 83, illustrating the effect of illumination, by depicting the absorption intensity 81 as a function of the energy 82 of the light used for the illumination, through the real experimental data 85 and a mathematical fit 86 of the real experimental data 85 as a function of the energy 82. It is known that excitation of $Eu^{2+}$ induces trapping in $SrAl_2O_4$:$Eu^{2+}$,$Sm^{3+}$. One of the proposed trapping mechanisms is based on the oxidation and simultaneous reduction of $Eu^{2+}$/$Sm^{3+}$ to $Eu^{3+}$/$Sm^{2+}$. To verify the existence of these valence changes suggested by the mechanism, the phosphor of the light sensitive layer was subjected to X-ray absorption spectroscopy measurements. FIG. 8 proves the coexistence of both divalent and trivalent europium and samarium. To link the valence changes of the dopant ions to the trapping process, the phosphor was alternately illuminated with UV and IR light to respectively enhance or attenuate the trapping. The difference of UV and IR illuminated samples is shown to highlight the changes induced by illumination. From these results, it is evident that UV or blue light induces the following reaction:

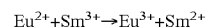

Whereas illuminating with IR light induces the opposite reaction:

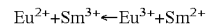

FIG. 9(a) schematically illustrates the absorptance 91 of dopant ions of an example embodiment of the light sensitive layer according to the present disclosure as a function of wavelength 92 and the normalized intensity of the optically stimulated luminescence 93 of the example embodiment of the light sensitive layer according to the present disclosure as a function of wavelength 92. A measurement of a diffuse reflectance spectrum of the phosphor of the light sensitive layer after 15 minutes of irradiation with an IR laser or after 15 minutes of illumination by blue LED allows to determine the absorptance spectrum of the filled traps. The resulting spectrum is shown in FIG. 9(a) and consists of a broad band centered around 600 nm. Below 550 nm the spectrum is dominated by $Eu^{2+}$ absorption obscuring the signal due to filled traps. Nevertheless, based on earlier reports in literature the absorption band can be attributed to the $4f^6 \rightarrow 4f^5 5d^1$ transition of $Sm^{2+}$. To find the optimal stimulation wavelength i.e. the wavelength that allows to 'empty' the phosphor as efficiently as possible, an OSL excitation spectrum was measured. This spectrum was recorded by exposing the fully charged phosphor to light with different wavelengths and integrating the OSL emitted during the first 5 minutes of stimulation. The result is overlaid on FIG. 9(a) on the absorptance spectrum of the $Sm^{3+}$ from which it is evident that the stimulation efficiency exhibits the same wavelength dependence as the absorptance. From this it can be concluded that the OSL in $SrAl_2O_4$:$Eu^{2+}$,$Sm^{3+}$ can be induced via excitation of $Sm^{2+}$. Moreover, the results indicate that red light is most efficient to empty the phosphor. FIG. 9(b) depicts the photoluminescence excitation spectrum 73 recorded at $\lambda_{em}$=520 nm, i.e. the normalized photoluminescence intensity 73 of $Eu^{2+}$, in function of the excitation wavelength 74 in nanometers. FIG. 9(b) further depicts the trap filling spectrum 76 of $SrAl_2O_4$:$Eu^{2+}$,$Sm^{3+}$ corresponding to the wavelength response of the light sensitive layer according to the present disclosure, i.e. the normalized OSL intensity 75, in function of the wavelength 74 in nanometers. The trap filling spectrum of FIG. 9(b) shows that similar results can be obtained for all wavelengths between 250 nm and 475 nm. However, the light sensitive layer according to the present disclosure can also be configured to measure intensities of light with a longer wavelength, provided that this light can induce optically stimulated detrapping. In this case it is imperative that the phosphor is exposed to UV or blue light prior to the measurement to ensure maximal trap filling. Exposure of this saturated phosphor layer to the longer wavelength light will then lead to a gradual depletion of the phosphor. Information about the integrated dose can in this case be obtained by comparing the intensity of the residual OSL signal to the maximally obtainable intensity of a fully saturated phosphor layer.

Figure 10:
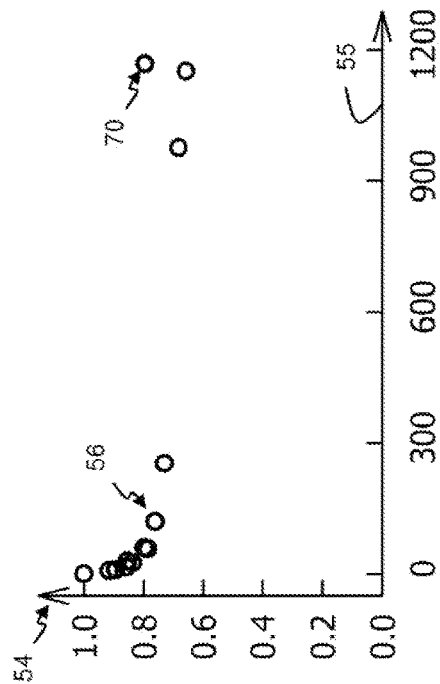
FIG. 10, including FIGS. 10(a) to 10(c), schematically illustrates a dose dependence and fading measurement of an example embodiment of a light sensitive layer according to the present disclosure.
Figure 10:
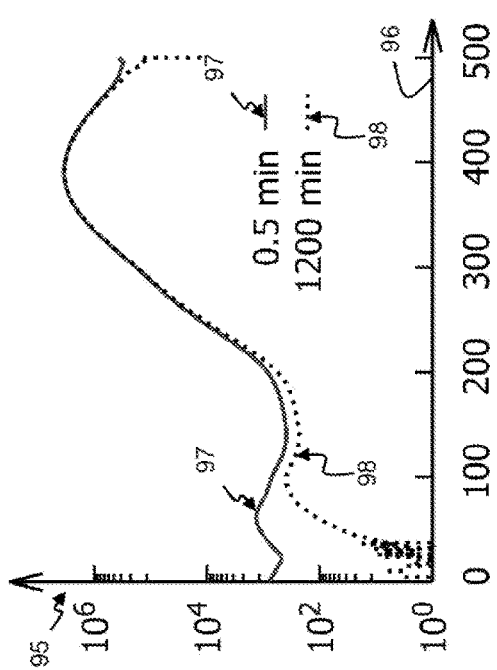
Figure 10:
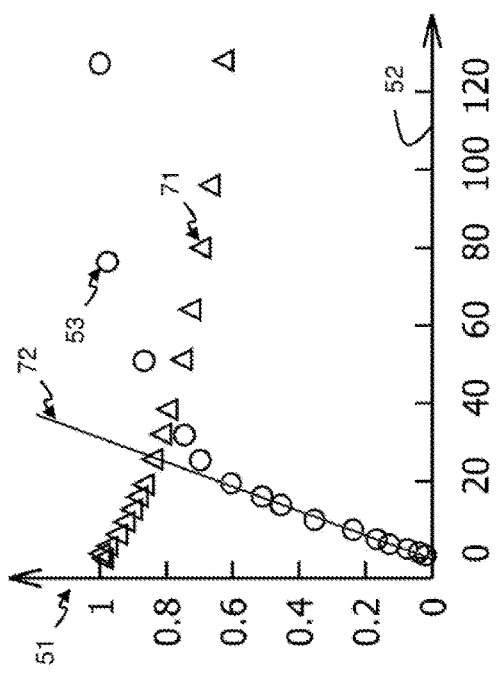

From a dosimetric point of view it is also important that the resulting OSL intensity is linearly dependent on the amount of UV light to which the phosphor was exposed or that non-linearity can be corrected for. A detailed dose dependence measurement was carried out and the results are shown in FIG. 10. Excitation of the phosphor was carried out using blue light at 450 nm and 42.3 µW·cm$^2$ and stimulation of the phosphor was carried out using a red laser at 660 nm and 70 mW for one hour prior to every measurement. This is the time required to let the OSL signal of a fully charged or saturated phosphor drop to the background level. FIG. 10(a) depicts the integrated OSL intensity 51 as a function of the integrated dose 52 in mJ·cm$^2$ and illustrates the forward dose dependence of the OSL intensity after illuminating an empty phosphor with different doses of blue light at 450 nm. The actual experimental data of the integrated OSL intensity 53 as a function of the integrated dose 52 in mJ·cm$^2$ is fitted along the fit function 72 schematically depicted on FIG. 10(a). From this fit, it is clear that the integrated OSL intensity 53 is initially linearly dependent on the applied dose up to an integrated dose of 19.5 mJ·cm$^2$. This value will be different for other phosphor compositions and depends on the storage capacity of the phosphor, the absorption strength for the wavelengths to be measured and the trapping probability following this absorption. At higher doses, the integrated OSL intensity 53 saturates implying a maximum filling of the traps is achieved. FIG. 10(a) also depicts the integrated OSL intensity 71 as a function of the integrated dose 52 in mJ·cm$^2$ and illustrates the reverse dose dependence of the OSL intensity 71 after illuminating a saturated phosphor with different amounts of red light at 645 nm and 0.64 mW·cm$^2$. FIG. 10(a) therefore shows the dependency of the OSL signal of a fully saturated phosphor after exposure to different amounts of red light ($\lambda$=645 nm). The effect of fading was taken into account by keeping the time between excitation with blue light and read-out fixed, independent of the illumination time. The decrease of the OSL signal in FIG. 10(a) is therefore only due to exposure of the phosphor to red light, illustrating that the material can indeed be used to measure intensities of light with a wavelength between 500 nm and 850 nm as well (cf. FIG. 9(a)). FIG. 10(b) depicts the normalized integrated OSL intensity 54 as a function of fading time 55 and illustrates the decrease in OSL intensity 56 when the time between excitation and OSL is varied. The OSL output is initially linearly dependent on the applied dose but at higher doses saturation effects occur implying a maximum filling of the traps is achieved. The stability of the signal over time was tested in a conventional fading experiment during which the phosphor is charged into saturation and the time between charging and optical stimulation is varied from 1 to 1120 minutes. It is evident from FIG. 10(b) that the signal fades quickly during the first two hours, after which the remaining signal stabilizes around 60% of the original intensity. This fading is an unwanted effect for dosimetric applications but is most likely due to the presence of unwanted shallow trapping centers which are also responsible for the material's afterglow. Carefully tweaking the synthesis procedure and using a higher precursor purity might offer a way to avoid these shallow traps. The effect of an electron-beam annealing treatment of the phosphor is shown at point 70 on FIG. 10(b). The phosphor is submitted to an electron-beam annealing treatment in vacuum and this e-beam annealing treatment largely suppresses the fading, with a signal loss of only 22% after one day of storage. FIG. 10(c) illustrates the results of a thermoluminescence fading experiment. FIG. 10(c) depicts the thermoluminescence intensity 95 in logarithmic scale as a function of the temperature 96 in degrees Celsius. The SrAl2O4:Eu,Sm phosphor is exposed to blue light at room temperature, in this experiment at a wavelength of 470 nm, thereby inducing a forward electron transfer and ensuring that the phosphor is saturated. After this the phosphor is heated at a constant heating rate of 0.2° C./s and the luminescence as a function of temperature is recorded. The waiting time between illumination with blue light and the start of the heating is varied from 0.5 minutes for the curve with reference 97 to 1200 minutes for the curve with reference 98. The difference in signal for the two waiting times 97; 98 illustrates that shallow trapping defects, giving rise to the TL signal at low temperatures, are not stable and are responsible for the fading of the OSL signal 56 observed in FIG. 10(b) whereas the deeper traps related to Sm$^{2+}$ are thermally stable at room temperature and do not show any fading.

Figure 11:
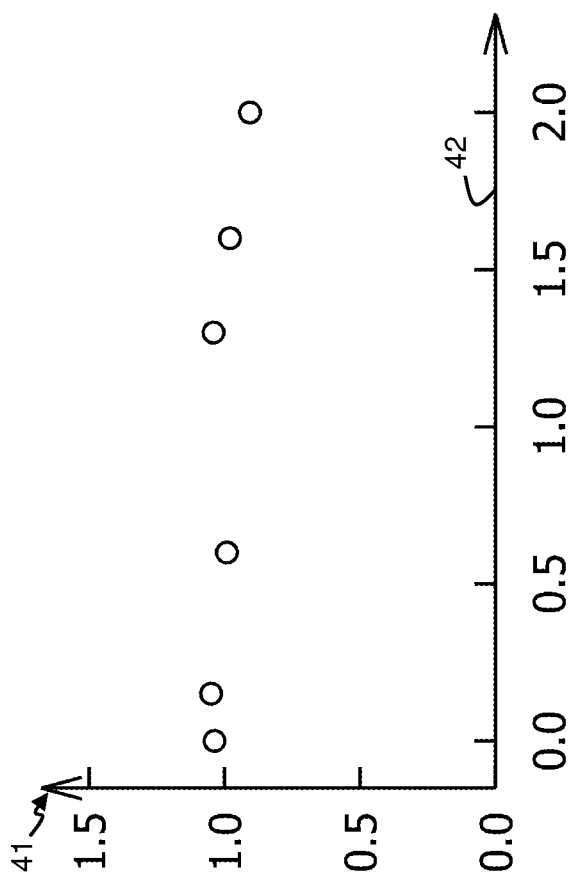
FIG. 11 schematically illustrates the effect of the dose rate on the optically stimulated luminescence of an example embodiment of a light sensitive layer according to the present disclosure.

The response of a light sensing device according to the present invention should be independent of the dose rate. A short exposure to light with a high intensity should give the same result as a long exposure to light with low intensities. FIG. 11 illustrates the effect of the dose rate on the OLS intensity by depicting the normalized OSL intensity 41 as a function of different optical densities of absorbance neutral density filters 42. Using neutral density filters with different optical densities, OD, the phosphor is exposed to light with different intensities, but the illumination time is varied to ensure the integrated dose is the same for all intensities. The results are shown in FIG. 11 and it can be seen that the OSL intensity 41 deviates only slightly while the excitation intensities are varied over two orders of magnitude. This shows that the optical response of the material is indeed independent of the applied dose rate. The slight decrease in OSL intensity at lower excitation intensities, and therefore longer excitation times, is related to the fading shown in FIG. 10(b).

Figure 12:
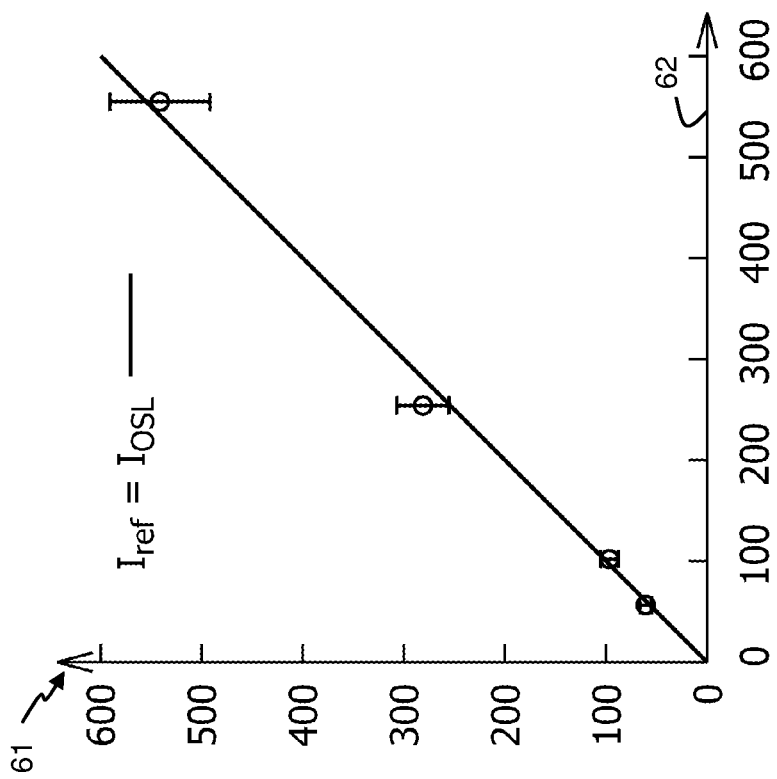
FIG. 12 schematically illustrates the correspondence between the performance of a prior art lux-meter and the performance of an example embodiment of a light sensitive layer according to the present disclosure.

FIG. 12 illustrates a comparison between the measurement of a light sensing device according to the present invention and the measurement of a prior art commercial lux-meter of the daylight intensity in Ghent, Belgium, during four consecutive days. FIG. 12 depicts and compares the light intensity 61 of the optically stimulated luminescence of the light sensing device and the light intensity 62 of the lux-meter and each data point corresponds to the one of each of the measurement days. FIG. 12 shows the very good agreement between the measurements of the light sensing device according to the present invention and the measurements of a prior-art commercial lux-meter.

Figure 13:
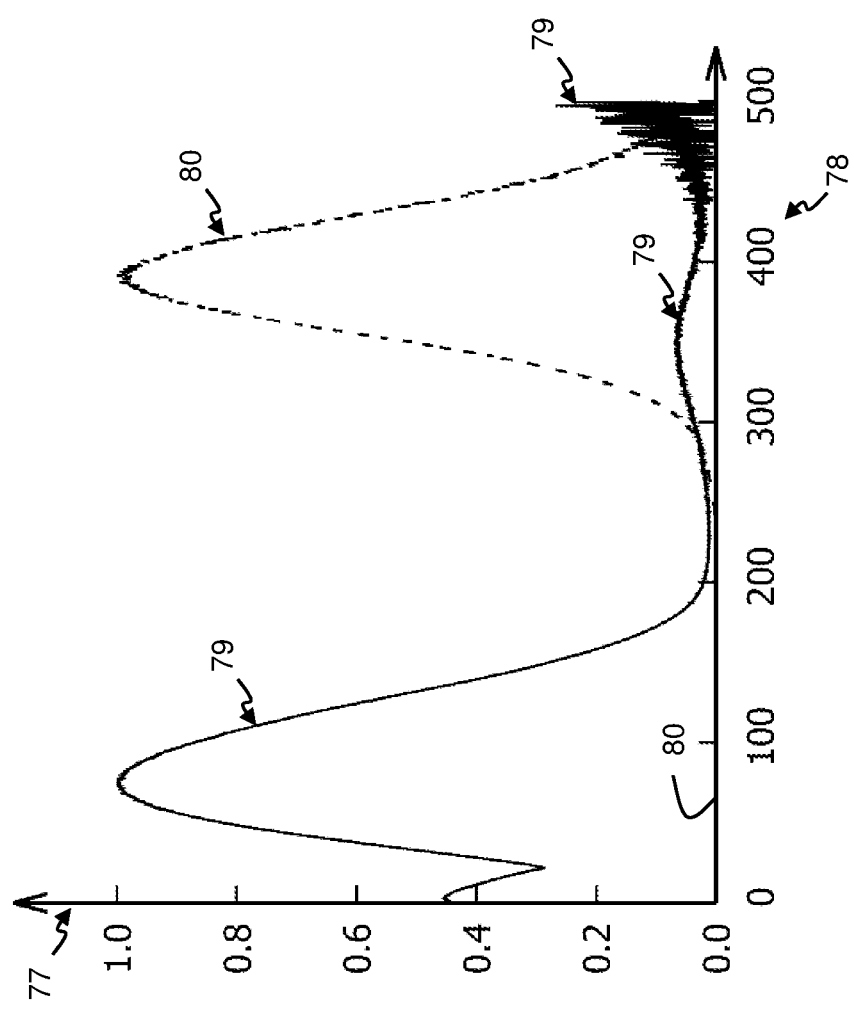
FIG. 13 schematically illustrates thermoluminescence measurements of an example embodiment of a light sensitive layer according to the present disclosure.

FIG. 13 illustrates thermoluminescence measurements of an example embodiment of a light sensitive layer according to the present disclosure. The thermoluminescence measurements were performed using an automated Risø thermoluminescence/OSL reader equipped with blue ($\lambda_{max}$=470 nm and FWMH=32 nm) LEDs providing an excitation intensity of 0.55 mW·cm$^2$ at sample position. All glow curves were recorded while heating under a nitrogen atmosphere. A combination of a Schott BG39 and a Schott BG3 filter was used in front of a photomultiplier tube, enabling detection of the green thermoluminescence signal. Excitation of the phosphor was always carried out at room temperature using blue light. FIG. 13 depicts the normalized thermoluminescence intensity 77 of $SrAl_2O_4:Eu^{2+}$ codoped with $Dy^{3+}$ in the curve 79 as a function of the temperature 78 in degrees Celsius. FIG. 13 further depicts the normalized thermoluminescence intensity 77 of $SrAl_2O_4:Eu^{2+}$ codoped with $Sm^{3+}$ in the curve 80 as a function of the temperature 78 in degrees Celsius. Both thermoluminescence curves are corrected for thermal quenching. Both thermoluminescence curves have been recorded at a heating rate of 0.2° C./s after excitation with blue light at 470 nm for 30 seconds. It can be seen from FIG. 13 that the $Dy^{3+}$-codoped phosphor exhibits a broad thermoluminescence curve at low temperatures, which is responsible for the phosphor's excellent afterglow properties, whereas the $Sm^{3+}$-codoped thermoluminescence curve consists mainly of a broad band above 300° C. The shift of the TL curve to higher temperature when going from a Dy codopant to a Sm codopant illustrates the increased thermal stability of the charge transfer state in $SrAl_2O_4:Eu,Sm$ Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a" "b", "c" and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A light sensing device for measuring a light intensity, comprising:
    a light sensitive layer comprising a phosphor into which two different types of dopant ions are incorporated,
    wherein one of said types of dopant ions is a first lanthanide and wherein the other one of said types of dopant ions is a second lanthanide different from said first lanthanide;
    wherein said dopant ions are in a first state and/or in a second state and wherein:
    a charge transfer of said dopant ions from said first state to said second state happens when said light sensitive layer is exposed to a second light energy, and
    wherein said charge transfer of said dopant ions from said first state to said second state corresponds to a reverse charge transfer between said first lanthanide and said second lanthanide; and
    a charge transfer of said dopant ions from said second state to said first state happens when said light sensitive layer is exposed to a first light energy larger than said second light energy,
    wherein said first light energy corresponds to a wavelength comprised between 200 nm and 600 nm; and
    wherein said charge transfer of said dopant ions from said second state to said first state corresponds to a forward charge transfer between said first lanthanide and said second lanthanide;
    one or more optical filters on top of said light sensitive layer and being used to tune a spectral response of said light sensing device;
    wherein said optical filters comprise a neutral density filter configured to allow tuning a dynamic range of said light sensing device; and wherein:
    when said dopant ions are in said second state after exposure of said light sensitive layer to said second light energy, said light sensitive layer is configured to measure a first light intensity,
    wherein said first light intensity is an intensity of light of said first light energy inducing said forward charge transfer between said first lanthanide and said second lanthanide bringing an amount of dopant ions from said second state to said first state; and
    when said dopant ions are in said first state after exposure of said light sensitive layer to said first light energy, said light sensitive layer is configured to measure a second light intensity,
    wherein said second light intensity is an intensity of light of said second light energy inducing said reverse charge transfer between said first lanthanide and said second lanthanide bringing an amount of dopant ions from said first state to said second state.

2. The light sensing device according to claim 1, wherein said first light energy corresponds to a first wavelength which is shorter than the emission wavelength of said phosphor.

3. The light sensing device according to claim 1, wherein said second light energy corresponds to a second wavelength which is longer than the emission wavelength of said phosphor.

4. The light sensing device according to claim 1, wherein said light sensing device further comprises a casing positioned between said light sensitive layer and said one or more optical filters when said light sensitive layer measures said first light intensity or when said light sensitive layer measures said second light intensity.

5. The light sensing device according to claim 1, wherein said one or more optical filters comprise one or more of the following:
    a color filter configured to allow selecting a wavelength range over which said light sensing device operates.

6. A read-out device for determining a light intensity measured by a light sensing device according to claim 1, wherein said read-out device comprises:
    a stimulation light source configured to emit light of said second light energy and to expose said light sensitive layer to said second light energy, thereby allowing a charge transfer of said dopant ions from said first state to said second state; and
    an excitation light source configured to emit light of said first light energy and to expose said light sensitive layer to said first light energy, thereby allowing a charge transfer of said dopant ions from said second state to said first state.

7. The read-out device according to claim 6, wherein said read-out device further comprises:
a read-out optical filter positioned between said light sensitive layer and said sensor; and
wherein said sensor is configured to determine a read-out light intensity emitted by said light sensitive layer when said light sensitive layer is exposed to said second light energy of said stimulation light source; and
wherein said read-out optical filter is configured to discriminate between said read-out light intensity and said second light energy of said stimulation light source when said light sensitive layer is exposed to said second light energy.

8. The read-out device according to claim 7, wherein said read-out light intensity is an optically stimulated luminescence of said light sensitive layer; and wherein:
said optically stimulated luminescence corresponds to a first light intensity of light of said first light energy measured by said light sensitive layer; or
a second light intensity of light of said second light energy measured by said light sensitive layer can be determined from said optical stimulated luminescence.

9. A wireless light dosimeter comprising one or more light sensing devices, and a read-out device according to claim 6.

10. A method for determining a light intensity, comprising:
providing a light sensitive layer comprising a phosphor into which two different types of dopant ions are incorporated, wherein one of said types of dopant ions is a first lanthanide and
wherein the other one of said types of dopant ions is a second lanthanide different from said first lanthanide;
wherein said dopant ions are in a first state and/or in a second state and wherein:
a charge transfer of said dopant ions from said first state to said second state happens when said light sensitive layer is exposed to a second light energy, and
wherein said charge transfer of said dopant ions from said first state to said second state corresponds to a reverse charge transfer between said first lanthanide and said second lanthanide; and
a charge transfer of said dopant ions from said second state to said first state happens when said light sensitive layer is exposed to a first light energy larger than said second light energy,
wherein said first light energy corresponds to a wavelength comprised between 200 nm and 600 nm; and
wherein said charge transfer of said dopant ions from said second state to said first state corresponds to a forward charge transfer between said first lanthanide and said second lanthanide;
providing one or more optical filters on top of said light sensitive layer and being used to tune a spectral response of said light sensing device;
wherein said optical filters comprise a neutral density filter configured to allow tuning a dynamic range of said light sensing device; and
wherein said method further comprises:
exposing said light sensitive layer to said second light energy, thereby bringing said dopant ions in said second state; and
measuring with said light sensitive layer a first light intensity,
wherein said first light intensity is an intensity of light of said first light energy inducing said forward charge transfer between said first lanthanide and said second lanthanide bringing an amount of dopant ions from said second state to said first state; or:
exposing said light sensitive layer to said first light energy, thereby bringing said dopant ions in said first state; and
measuring with said light sensitive layer a second light intensity,
wherein said second light intensity is an intensity of light of said second light energy inducing said reverse charge transfer between said first lanthanide and said second lanthanide bringing an amount of dopant ions from said first state to said second state.

11. The method for determining a light intensity according to claim 10, wherein said method further comprises the steps of:
providing a stimulation light source configured to emit light of said second light energy and to expose said light sensitive layer to said second light energy, thereby allowing a charge transfer of said dopant ions from said first state to said second state;
providing an excitation light source configured to emit light of said first light energy and to expose said light sensitive layer to said first light energy, thereby allowing a charge transfer of said dopant ions from said second state to said first state;
providing a sensor;
providing a read-out optical filter positioned between said light sensitive layer and said sensor; and
wherein said method further comprises:
when said light sensitive layer has measured said first light intensity or said second light intensity, illuminating said light sensitive layer with said stimulation light source, thereby inducing a charge transfer between said dopant ions; and
collecting on said sensor an optically stimulated luminescence of said light sensitive layer stimulated by said stimulation light source, thereby determining said first light intensity or said second light intensity measured by said light sensitive layer.

12. The method according to claim 10, wherein said method further comprises one or more of the steps of:
prior to measuring said first light intensity with said light sensitive layer, illuminating said light sensitive layer with said stimulation light source, thereby minimizing an amount of said dopant ions in said first state in said light sensitive layer;
prior to measuring said second light intensity with said light sensitive layer, illuminating said light sensitive layer with said excitation light source, thereby maximizing an amount of said dopant ions in said first state in said light sensitive layer.

* * * * *